US 8,756,553 B2

(12) United States Patent
Suwada

(10) Patent No.: US 8,756,553 B2
(45) Date of Patent: Jun. 17, 2014

(54) COMPUTER PRODUCT, DESIGN SUPPORT METHOD, DESIGN SUPPORT APPARATUS, AND MANUFACTURE METHOD

(71) Applicant: Fujitsu Limited, Kawasaki (JP)

(72) Inventor: Makoto Suwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/726,211

(22) Filed: Dec. 23, 2012

(65) Prior Publication Data
US 2013/0254733 A1    Sep. 26, 2013

(30) Foreign Application Priority Data
Mar. 26, 2012    (JP) ................................. 2012-070457

(51) Int. Cl.
*G06F 17/50*    (2006.01)
(52) U.S. Cl.
USPC ............................ 716/129; 716/120; 716/130
(58) Field of Classification Search
USPC ........................................................ 716/129
See application file for complete search history.

(56) References Cited

U.S. PATENT DOCUMENTS

| 2009/0173525 A1 | 7/2009 | Morita |
| 2011/0078895 A1 | 4/2011 | Suwada |
| 2011/0232949 A1 | 9/2011 | Yamada et al. |

FOREIGN PATENT DOCUMENTS

| JP | 2011-82271 | 4/2011 |
| JP | 2009-164416 | 7/2011 |
| JP | 2011-210839 | 10/2011 |

*Primary Examiner* — Paul Dinh
*Assistant Examiner* — Bryce Aisaka
(74) *Attorney, Agent, or Firm* — Fujitsu Patent Center

(57) ABSTRACT

A design support apparatus acquires position information for a signal wire that is to be disposed in wiring layer stacked on an insulation layer. Subsequently, the design support apparatus acquires position information for an area obtained by projecting, in a direction for glass fiber bundles to be stacked on one another, the glass fiber bundles in an insulation layer actually used. The design support apparatus converts the position information for the signal wire that is to be disposed into position information for a position in the area of the glass fiber bundles such that the signal wire is included in the area of the glass fiber bundles in the insulation layer actually used. The design support apparatus outputs the converted position information.

7 Claims, 19 Drawing Sheets

UPPER LAYER

LOWER LAYER

FIG.19A
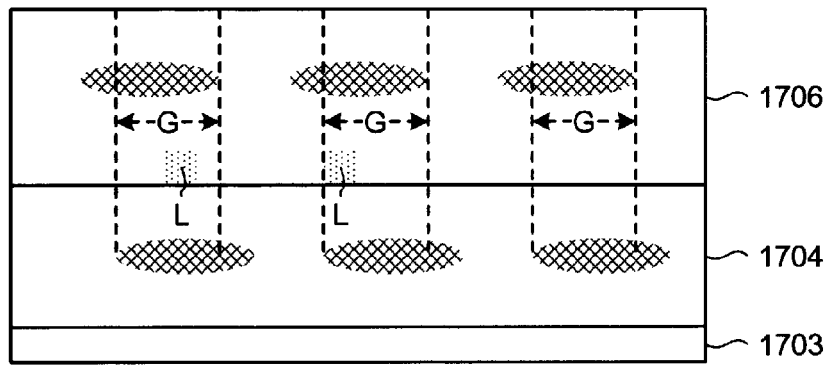
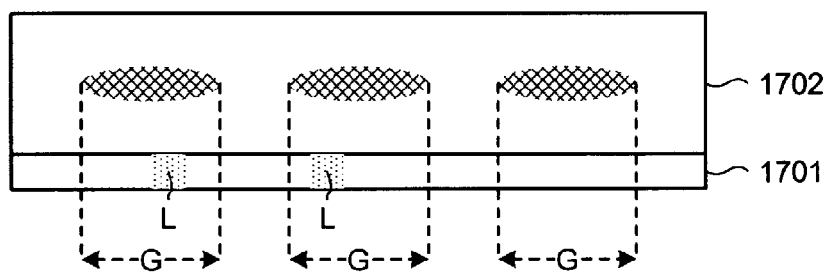
FIG.19B
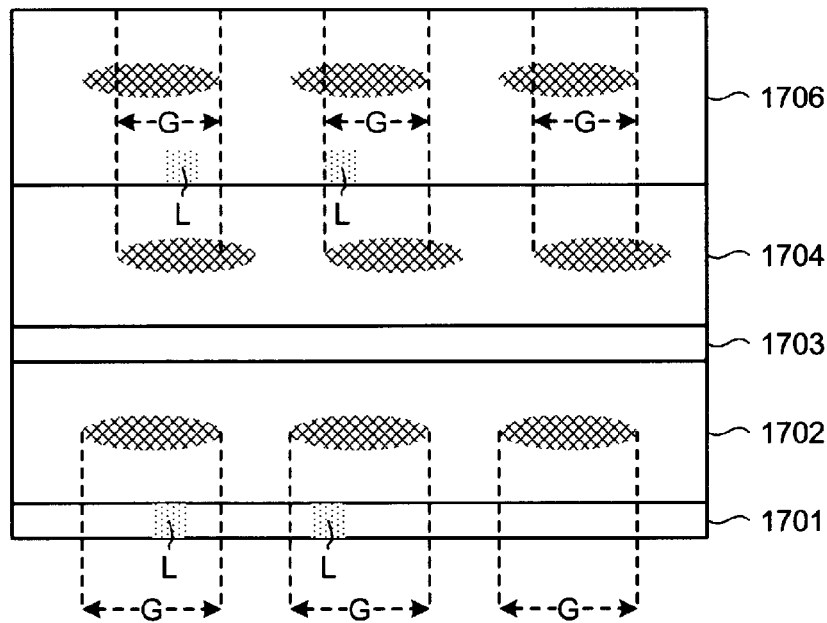

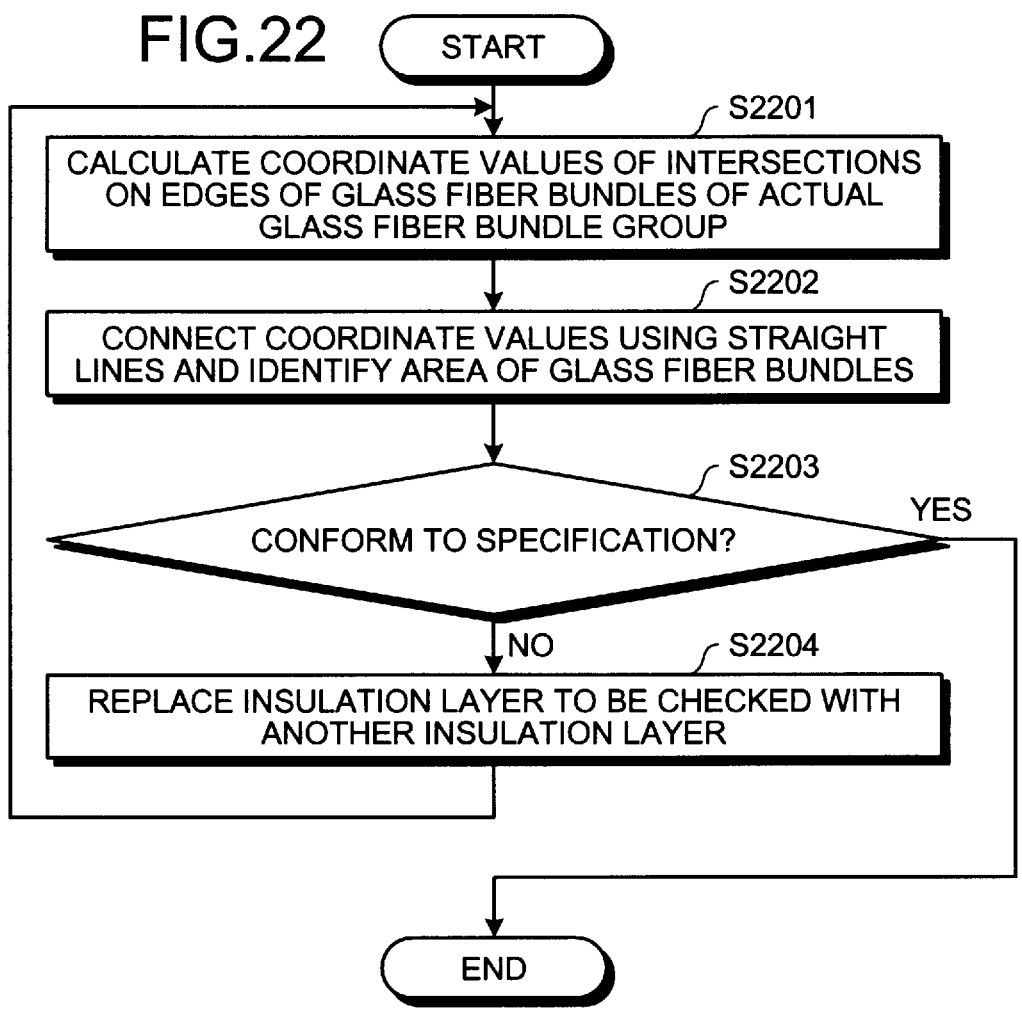

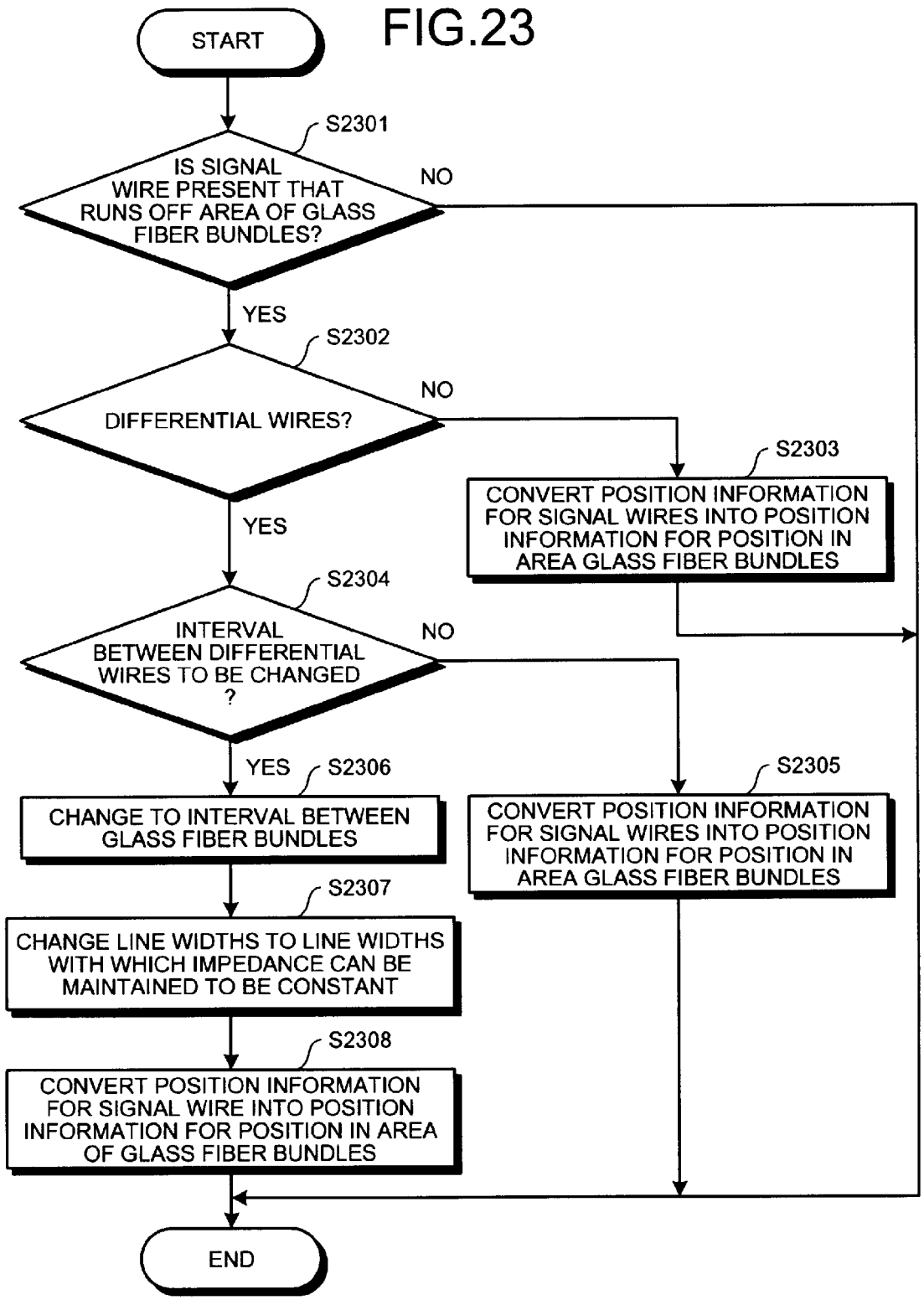

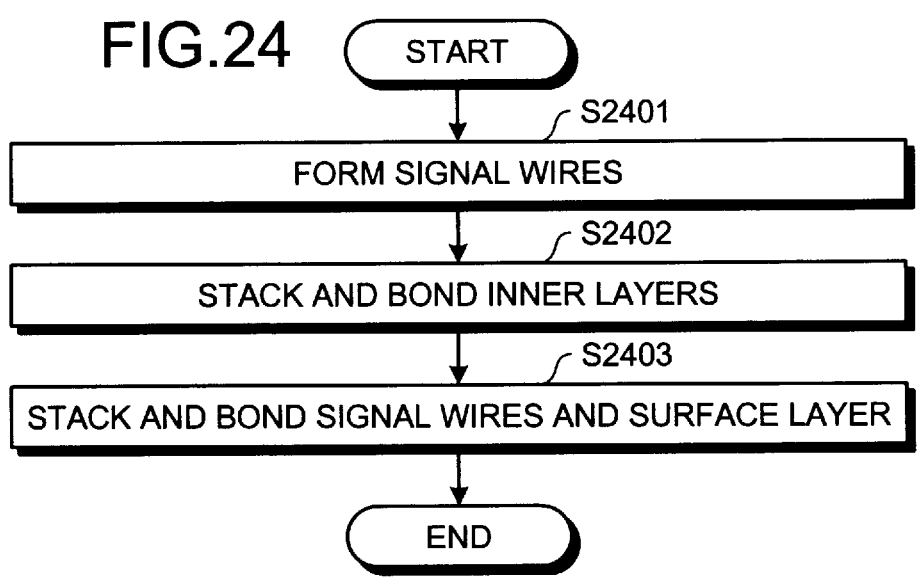

COMPUTER PRODUCT, DESIGN SUPPORT METHOD, DESIGN SUPPORT APPARATUS, AND MANUFACTURE METHOD

CROSS REFERENCE TO RELATED APPLICATIONS

This application is based upon and claims the benefit of priority of the prior Japanese Patent Application No. 2012-070457, filed on Mar. 26, 2012, the entire contents of which are incorporated herein by reference.

FIELD

The embodiment discussed herein is related to a computer product, a design support method, a design support apparatus, and a manufacture method.

BACKGROUND

A resin substrate is conventionally used as an insulation layer of a substrate. The resin substrate is formed by soaking a cloth of crisscross woven fiber bundles, in a resin and hardening the cloth. When a signal wire is disposed extending over both an area on glass fiber bundles and an area on the resin, the impedance of the signal wire can be varied depending on position due to the difference in the dielectric constant between the fiber bundle and the resin.

Thus, according to one technology, when the fiber bundles are present at a position conforming to the specification in the insulation layer, the wire position of a signal wire is determined such that the signal wire is disposed in an area on the fiber bundles (see, e.g., Japanese Laid-Open Patent Publication No. 2011-82271).

According to another technology, the fiber bundles in the insulation layer are colored; when the substrate is manufactured, a portion of copper foil to be a wiring layer stacked on the insulation layer is peeled and the colored fiber bundles are recognized; thereby, the position of the fiber bundles in the insulation layer is identified; and the wire position of the signal wire is changed such that the signal wire is disposed in the area on the fiber bundles identified (see, e.g., Japanese Laid-Open Patent Publication No. 2011-210839).

Among related technologies is a technology of determining the length and the shape of a signal wire to suppress impedance variations caused by the difference in the dielectric constant between the fiber bundles and the resin (see, e.g., Japanese Laid-Open Patent Publication No. 2009-164416).

However, according to the conventional technologies, disposal of the signal wire in the area on the fiber bundles may not be possible when difference in the position of the fiber bundles in the insulation layer arise consequent to manufacturing tolerances for the insulation layer. Thus, the signal wire may be disposed extending over both the area on the fiber bundles and the area on the resin, and the impedance of the signal wire vary depending on the position. Therefore, the insertion loss of the signal wire may increase.

SUMMARY

According to an aspect of an embodiment, a computer-readable recording medium stores a design support program that causes a computer to execute a process that includes acquiring position information for a signal wire in a wiring layer and position information for a fiber bundle group by projecting, in a direction for fiber bundles of the fiber bundle group to be stacked, the fiber bundle group in an insulation layer stacked on the wiring layer; detecting based on the position information for the signal wire and the position information for the fiber bundle group, a non-overlapping point where the signal wire and the fiber bundle group do not overlap in the direction for the fiber bundle group to be stacked; identifying based on the position information for the signal wire, position information for a signal wire portion of the signal wire, the signal wire portion including the detected non-overlapping point; and converting the identified position information for the signal wire portion into position information for a position in an area of the fiber bundles such that the signal wire portion is included in an area identified by the position information for fiber bundles that are parallel to a direction for the signal wire portion to be disposed, among the fiber bundle group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 17, 18A, 18B, 19A, 19B, and 20 are explanatory diagrams of an example of manufacturing by the manufacturing apparatus 204;

FIG. 22 is a flowchart of details of a process procedure of a check process executed by the checking apparatus 202;

FIG. 23 is a flowchart of details of a process procedure of a design support process executed by the design support apparatus 203; and FIG. 24 is a flowchart of details of a process procedure of a manufacturing process executed by the manufacturing apparatus 204.

DESCRIPTION OF EMBODIMENTS

An embodiment of a design support program, a design support method, a design support apparatus, and a manufacture method according to the present invention will be described in detail with reference to the accompanying drawings. When the wiring layer is stacked on an ideal insulation layer, the design support apparatus acquires position information for a signal wire that is to be disposed in a wiring layer, and position information for fiber bundles in an insulation layer that is actually used; and converts the position information for the signal wire into position information for a position on the fiber bundles in the insulation layer that is actually used.

The "fiber bundles" can be, for example, glass fiber bundles, carbon fiber bundles, polyester fiber bundles, Tetron (a registered trade mark) fiber bundles, Nylon (a registered trade mark) fiber bundles, or aramid fiber bundles. The fiber bundles in the insulation layer may be plain-woven, sateen-woven, or twill-woven. Hereinafter, glass fiber bundles will be taken as an example of the fiber bundles.

Thereby, a manufacturing apparatus can form the signal wire according to the position information converted by the design support apparatus such that the signal wire is included in an area on the glass fiber bundles in the insulation layer. The manufacturing apparatus can manufacture a substrate having impedance whose variation is suppressed, by stacking the signal wire and the insulation layer with each other.

Figure 1:
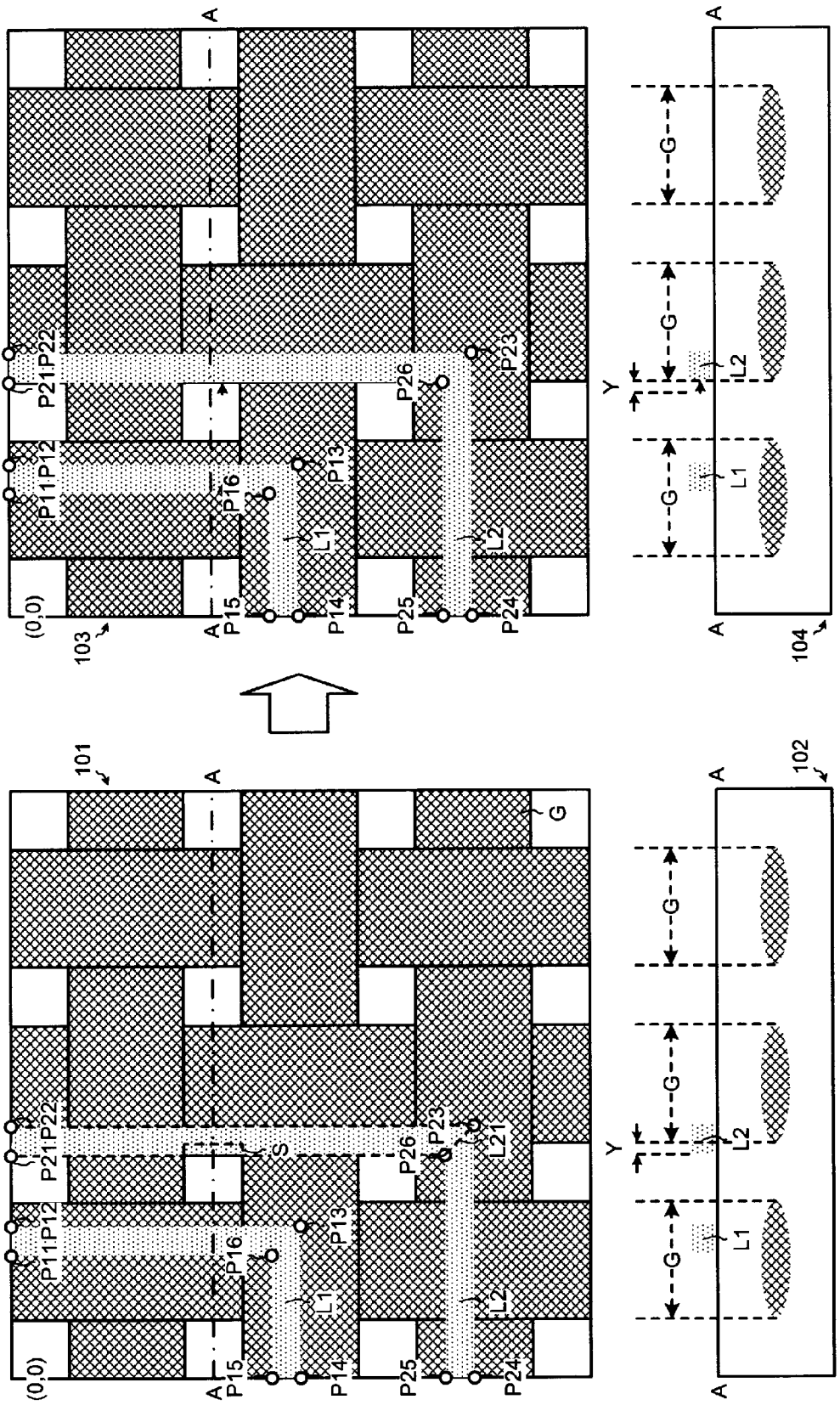
FIG. 1 is an explanatory diagram of an example of position conversion executed by a design support apparatus.

FIG. 1 is an explanatory diagram of an example of position conversion executed by the design support apparatus. As depicted in FIG. 1, the design support apparatus first acquires position information for the signal wire that is disposed in the wiring layer conforming to the specification of the insulation layer, such that the signal wire is included in an area G acquired by projecting, in the direction for the glass fiber bundles to be stacked, the glass fiber bundles that are in the insulation layer. The position information for the signal wire is, for example, coordinate values of vertexes of the signal wire determined when a specific point on the substrate is set to be the origin.

In the example of FIG. 1, the design support apparatus acquires the position information for two signal wires L1 and L2, respectively. The signal wires L1 and L2 are single-end wires. A "single-end wire" is a signal wire that transmits a signal alone by itself.

In the example of FIG. 1, the position information for the signal wire L1 indicates the coordinate values of vertexes P11 (21, 0), P12 (26, 0), P13 (26, 50), P14 (0, 50), P15 (0, 45), and P16 (21, 45), and the position information for the signal wire L2 indicates the coordinate values of vertexes P21 (38, 0), P22 (43, 0), P23 (43, 80), P24 (0, 80), P25 (0, 75), and P26 (38, 75).

The glass fiber bundles in the insulation layer to be actually used may be located at a position different from the position that conforms to the specification, consequent to the manufacture error tolerances. Therefore, when a signal wire is disposed according to the position information acquired on the signal wire, the signal wire may not be included in the area G of the glass fiber bundles in the insulation layer to be actually used.

A reference numeral "101" of FIG. 1 denotes a diagram of the insulation layer and the signal wires viewed in the direction for the insulation layer and the signal wires to be stacked when the signal wires are disposed according to the position information acquired on the signal wires. A reference numeral "102" of FIG. 1 denotes a cross-sectional view of the insulation layer and the signal wires depicted in the diagram 101; and is taken along a dotted line A-A. As depicted in FIG. 1, the signal wire L1 is included in the area G of the glass fiber bundles in the insulation layer to be actually used. However, the signal wire L2 extends in and out of the area G of the glass fiber bundles in the insulation layer to be actually used.

In this case, when the signal wire L2 is disposed according to the position information, the signal wire L2 is disposed extending over areas each having a dielectric constant different from that of each other as an area spreading off the area G of the glass fiber bundles and an area included in the area G of the glass fiber bundles. The insertion loss of the signal wire L2 is increased compared to that of the case where the entire signal wire L2 is included in the area G of the glass fiber bundles. The "insertion loss" refers to a loss of electric power transmitted by a signal wire.

Therefore, the design support apparatus converts the position information for the signal wire L2 into position information for the signal wire L2 to be included in the area G of the glass fiber bundles. The design support apparatus maintains the line width of the signal wire L2 to be the same line width for the impedance of the signal wire L2 to be constant before and after the conversion of the position information.

In the example of FIG. 1, the design support apparatus identifies a non-overlapping point S at which the signal wire L2 and the area G of the glass fiber bundles do not overlap with each other. The design support apparatus identifies a signal wire portion L21 that includes the non-overlapping point S and that is to be included in the area G of the glass fiber bundles.

The design support apparatus determines the amount of variation for the coordinate values, to convert the position information for the signal wire L2 into the position information for a position in the area G of the glass fiber bundles. The amount of variation is, for example, a length spanning from the left edge of the signal wire portion L21 to the left edge of the glass fiber bundle close to the signal wire portion L21, in the X-axis direction that is the line width direction of the signal wire portion L21 identified.

The design support apparatus converts the position information for the signal wire L2 into position information for the position in the area G of the glass fiber bundles by adding the identified amount of variation to the X-axis coordinate values of each of the vertexes P21, P22, P23, and P26 that are included in the signal wire portion L21. When the signal wire L2 is a single-end wire, the position information for the signal wire L1 does not need to be converted.

The design support apparatus determines that the amount of variation is a length Y that is "Y=2" and that spans from the signal wire portion L21 to the glass fiber bundle. The design support apparatus converts the coordinate values (38, 0) of the vertex P21 of the signal wire L2 into the coordinate values (40, 0) and the coordinate values (43, 0) of the vertex P22 into the coordinate values (45, 0) by adding the amount of variation to each of the X-coordinate values, and also converts the coordinate values (43, 80) of the vertex P23 into the coordinate values (45, 80) and the coordinate values (38, 75) of the vertex P26 into the coordinate values (40, 75) by adding the amount of variation to each of the X-coordinate values.

A reference numeral "103" of FIG. 1 denotes a diagram of the insulation layer and the signal wires viewed in the direction for the insulation layer and the signal wires to be stacked, when the signal wires are disposed according to the signal wire position information converted by the design support apparatus. A reference numeral "104" of FIG. 1 denotes a cross-sectional view of the insulation layer and the signal wires depicted in the diagram 103, and is taken along a dotted line A-A. As depicted in FIG. 1, the signal wire L2 is included in the area G of the glass fiber bundles when the signal wires are disposed according to the position information converted by the design support apparatus.

Thereby, the design support apparatus can determine the position of the signal wire L2 with which the variation of the impedance of the signal wire L2 can be reduced; and the insertion loss of the signal wire L2 can be reduced. The manufacturing apparatus can reduce the insertion loss of the signal wire L2 by forming the signal wire L2 according to the position information converted by the design support apparatus.

The signal wires L1 and L2 need not be a single-end wire and may be differential wires. "Differential wires" refer to two signal wires that transmit a signal as a pair. In this case, when the interval between the signal wires L1 and L2 varies, the differential impedance of the differential wires varies and skew is generated. Consequently, the transmission accuracy of the signal by the differential wires is degraded. The "differential impedance" is a value that indicates the degree of difficulty for an electric current to flow in the differential wires. The "skew" is a difference in the transmission time period between the signal wires of differential wires.

Therefore, to maintain constant differential impedance, the design support apparatus converts the position information for the signal wire L1 into the position information for the position in the area G of the glass fiber bundles simultaneously with the conversion of the position information for the signal wire L2, maintaining the interval between the signal wires L1 and L2.

Thereby, the manufacturing apparatus can form the signal wires L1 and L2 according to the position information converted by the design support apparatus and can reduce the insertion loss of each of the signal wires L1 and L2. The manufacturing apparatus can maintain the differential impedance of the signal wires L1 and L2 and can reduce the skew. A case will be described later with reference to FIGS. 8 and 9 where the design support apparatus converts the position information for the signal wire L1 simultaneously with the conversion of the position information for the signal wire L2, maintaining the interval between the signal wires L1 and L2.

When the design support apparatus can not convert the position information for the signal wire L1 into the position information for the position in the area G of the glass fiber bundles maintaining the interval between the signal wires L1 and L2, the design support apparatus changes the line widths of the signal wires L1 and L2 and the interval therebetween. The design support apparatus calculates the line widths of and the interval between the signal wires L1 and L2 after the change using, for example, a calculation equation of the differential impedance such that the differential impedance is constant before and after the change of the line widths and the interval. The design support apparatus coverts the position information for the signal wires L1 and L2 into the position information for the position in the area G of the glass fiber bundles such that the line widths of and the interval between the signal wires L1 and L2 are the line width and the interval that are calculated and the signal wires L1 and L2 are included in the area G of the glass fiber bundles.

Thus, the manufacturing apparatus can form the signal wires L1 and L2 according to the position information converted by the design support apparatus, and can reduce the insertion loss of each of the signal wires L1 and L2. The manufacturing apparatus can maintain constant differential impedance between the signal wires L1 and L2 and can reduce skew. A case will be described later with reference to FIGS. 10 to 12 where the design support apparatus converts the position information for the signal wires L1 and L2 by changing the line widths of and the interval between the signal wires L1 and L2.

An example of a manufacturing system to manufacture a substrate according to the position information converted by the design support apparatus depicted in FIG. 1 will be described with reference to FIG. 2.

Figure 2:
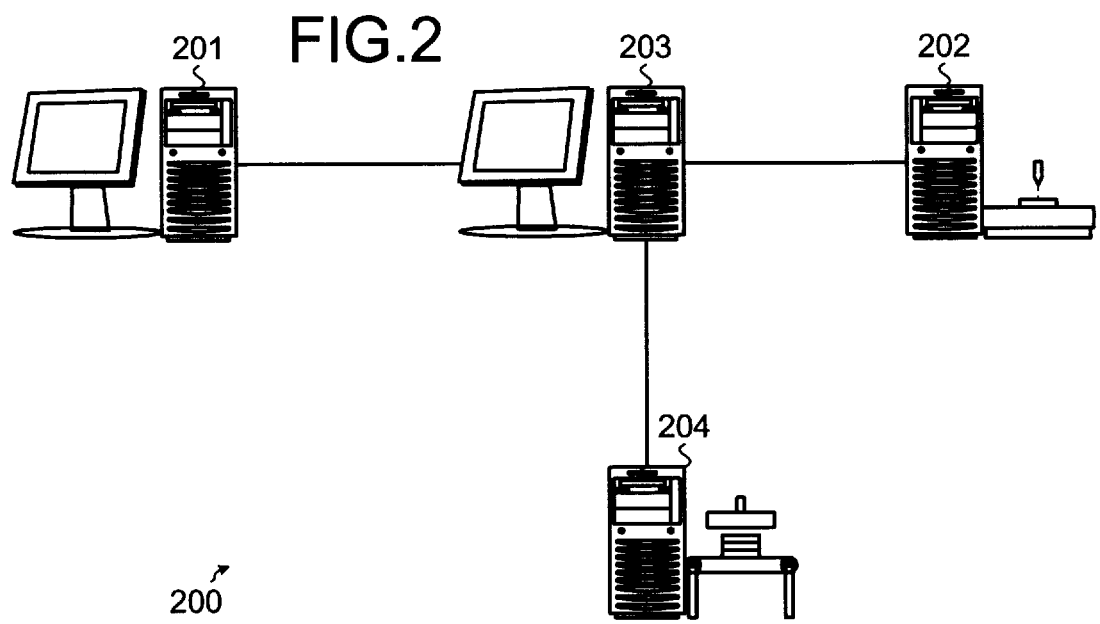
FIG. 2 is an explanatory diagram of an example of a manufacturing system.

FIG. 2 is an explanatory diagram of an example of the manufacturing system. The manufacturing system 200 includes a designing apparatus 201, a checking apparatus 202, a design support apparatus 203, and a manufacturing apparatus 204. The design support apparatus 203 is connected to the designing apparatus 201, the checking apparatus 202, and the manufacturing apparatus 204.

The designing apparatus 201 is a computer that determines the position information for a signal wire to be disposed in the wiring layer such that conforming to the specification of the insulation layer, the signal wire is included in the area G acquired by projecting, in the direction for the glass fiber bundles to be stacked, a glass fiber bundle group in the insulation layer. The designing apparatus 201 transmits the position information for the signal wire determined to the design support apparatus 203.

The checking apparatus 202 is a computer that identifies for the insulation layer to be actually used, the area G acquired by projecting the glass fiber bundle group (in the insulation layer) in the direction for the glass fiber bundles to be stacked. For example, the checking apparatus 202 applies an X-ray beam or an infrared light beam to the insulation layer and thereby, produces an image whose level of black color indicates the amount transmitted therethrough. The checking apparatus 202 identifies intersections of the glass fiber bundles from the image produced and identifies the area G of the glass fiber bundles from the intersections identified. The checking apparatus 202 transmits the area G of the glass fiber bundles identified to the design support apparatus 203.

The design support apparatus 203 is a computer that acquires from the designing apparatus 201, the position information for the signal wire disposed in the wiring layer such that the signal wire is included in the area G that is acquired by projecting the glass fiber bundle group (in the insulation layer) in the direction for the glass fiber bundles to be stacked, conforming to the specification of the insulation layer. The design support apparatus 203 acquires the area G of the glass fiber bundles from the checking apparatus 202. The design support apparatus 203 converts the position information for the signal wire acquired from the designing apparatus 201 into the position information in the area G of the glass fiber bundles such that the signal wire is included in the area G of the glass fiber bundles acquired from the checking apparatus 202. The design support apparatus 203 transmits the position information for the signal wire converted to the manufacturing apparatus 204.

The manufacturing apparatus 204 is a computer that manufactures the substrate according to the position of the signal wire determined by the design support apparatus 203. In this example, the designing apparatus 201, the checking apparatus 202, the design support apparatus 203, and the manufacturing apparatus 204 are different apparatuses. However, these apparatus are not limited hereto. For example, the design support apparatus 203 may further have at least one function among the functions of the designing apparatus 201, the checking apparatus 202, and the manufacturing apparatus 204. An example of a computer to be employed as each of the designing apparatus 201, the checking apparatus 202, the design support apparatus 203, and the manufacturing apparatus 204 will be described with reference to FIG. 3.

Figure 3:
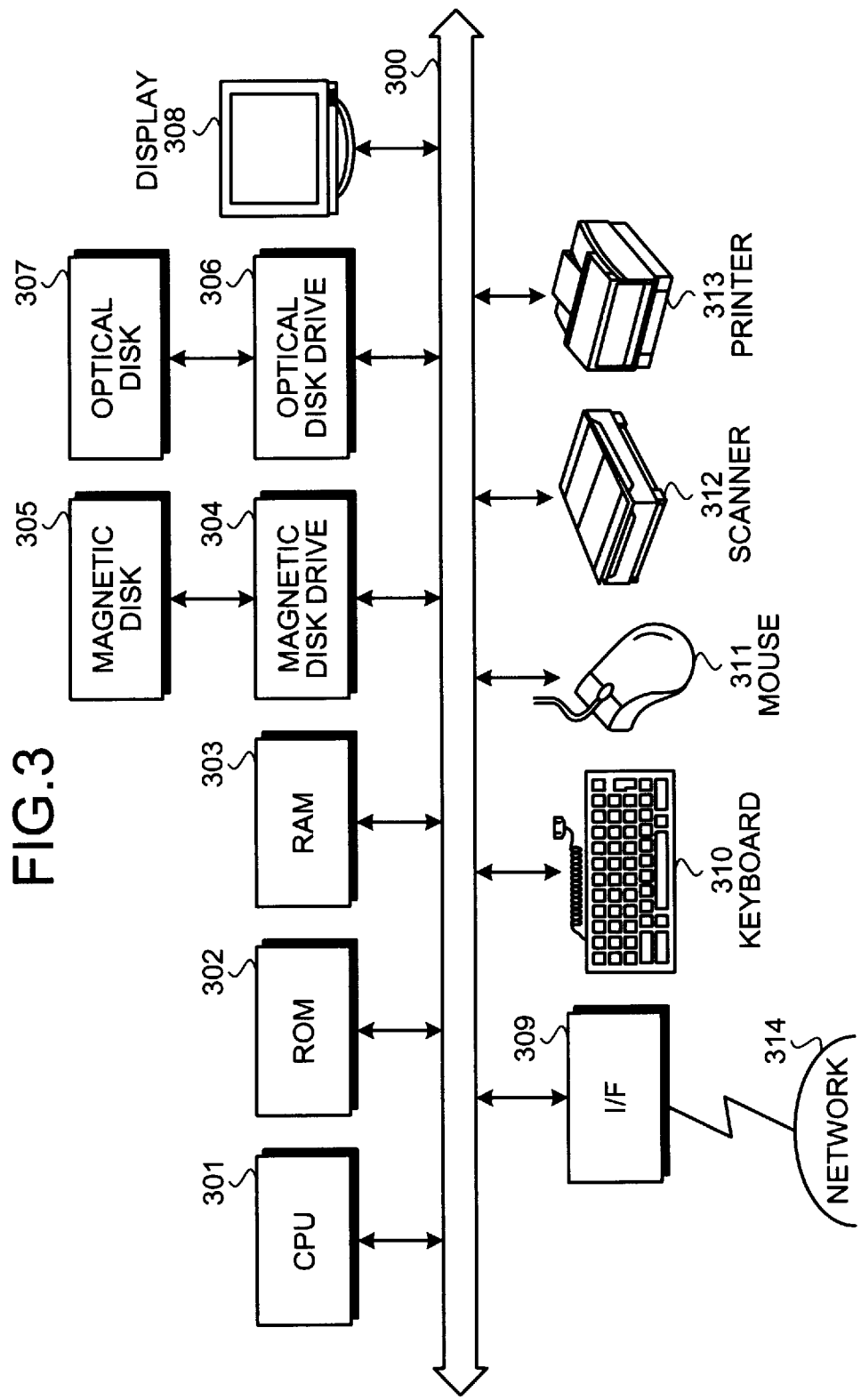
FIG. 3 is a block diagram of a hardware configuration of a computer.

FIG. 3 is a block diagram of a hardware configuration of the computer. The computer is employed as, for example, the designing apparatus 201, the checking apparatus 202, the design support apparatus 203, or the manufacturing apparatus 204.

As depicted in FIG. 3, the computer includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 300.

The CPU 301 governs overall control of the computer. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the computer. The scanner 312 may have an optical character reader (OCR) function as well. The printer 313 prints image data and text data. The printer 313 may be, for example, a laser printer or an ink jet printer. Further, configuration may be such any one or more among the optical drive 306, the optical disk 307, the display 308, the keyboard 310, the mouse 311, the scanner 312, and the printer is omitted.

The computer to function as the checking apparatus 202 may include, for example, an applying apparatus that applies an X-ray beam or an infrared light beam to the insulation layer, and a measuring apparatus that measures the amount of the X-ray beam or the infrared light beam transmitted through the insulation layer. The computer to function as the manufacturing apparatus 204 may include, for example, pressure boards that stack the insulation layer and the wiring layer to couple the insulation layer and the wiring layer with each other and a wiring layer for wiring the signal wires in the wiring layer.

An example of a functional configuration of the design support apparatus 203 and of the manufacturing apparatus 204 will be described with reference to FIG. 4.

Figure 4:
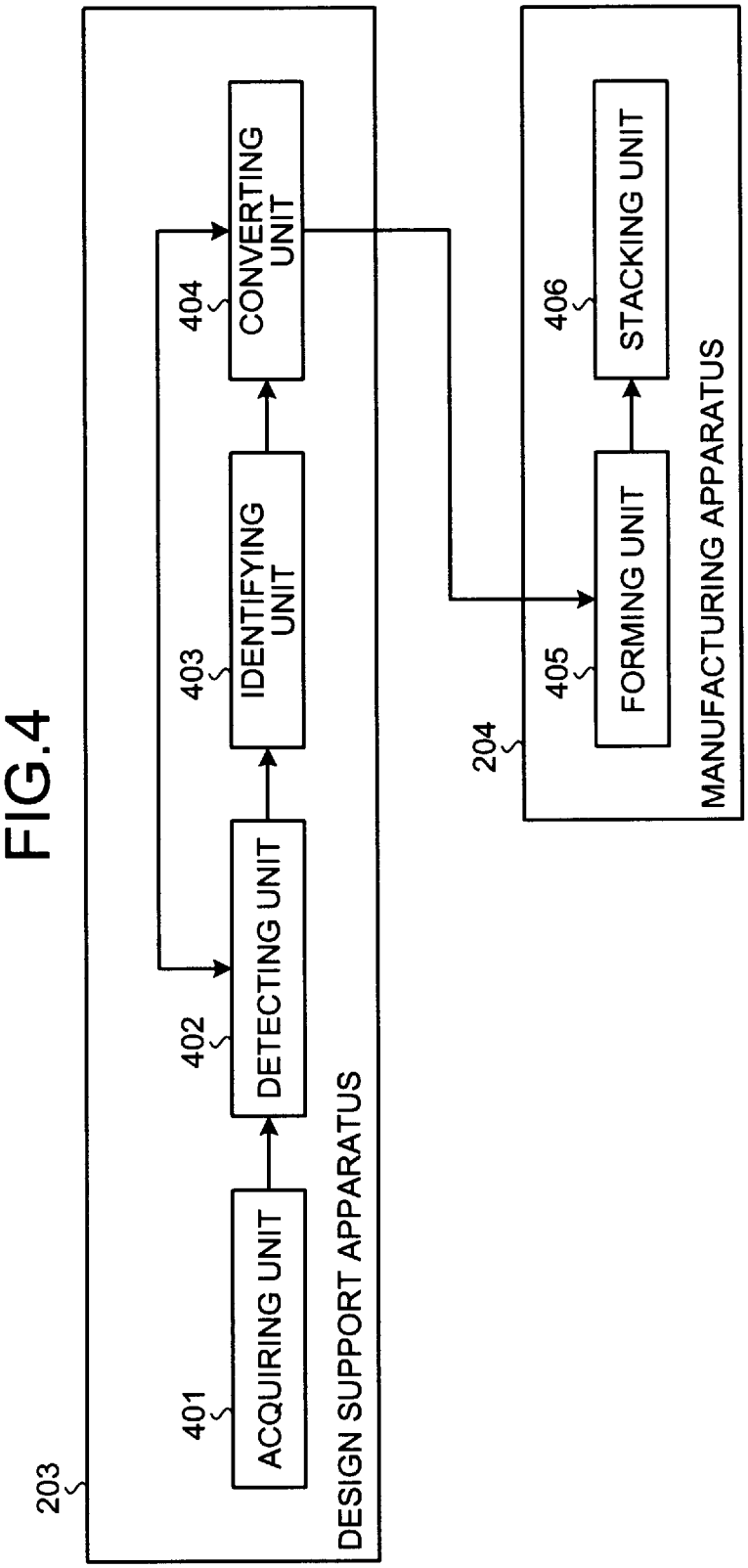
FIG. 4 is a block diagram of a functional configuration of a design support apparatus 203 and of a manufacturing apparatus 204.

FIG. 4 is a block diagram of a functional configuration of the design support apparatus 203 and of the manufacturing apparatus 204. Functions of the design support apparatus 203 will be described. The design support apparatus 203 includes an acquiring unit 401, a detecting unit 402, an identifying unit 403, and a converting unit 404. Functions of the acquiring unit 401, the detecting unit 402, the identifying unit 403, and the converting unit 404 are implemented by, for example, causing the CPU 301 to execute programs stored in a storing apparatus such as, for example, the ROM 302, the RAM 303, the magnetic disk 305, or the optical disk 307 or by using the I/F 309 that are depicted in FIG. 3.

The design support apparatus 203 can determine the position of a signal wire disposed on a given insulation layer and can determine the position of a signal wire disposed between two insulation layers. The signal wires may each be a signal wire for single-end wiring to transmit a signal alone by itself or may be signal wires for differential wiring to transmit a signal as a pair of signal wires.

A function will first be described that is used in a case where the design support apparatus 203 determines the position of a signal wire disposed for single-end wiring on a given insulation layer. This function is implemented by the acquiring unit 401, the detecting unit 402, the identifying unit 403, and the converting unit 404.

The acquiring unit 401 acquires the position information for the signal wire in the wiring layer and the position information for the fiber bundle group acquired by projecting the fiber bundle group (in the insulation layer) to be stacked on the wiring layer. The wiring layer is a layer of a conductive material that is, for example, copper foil. The insulation layer is a layer of an insulating material that is, for example, a resin substrate that is formed by soaking fiber bundles woven crisscross in a resin and hardening the fiber bundles. A fiber bundle is formed by bundling plural fibers. The position information is, for example, coordinate values of vertexes of the signal wire determined when a specific point on the substrate is set to be the origin. The coordinate values include an X-axis coordinate value representing the length from the origin to the vertex in the X-axis direction and a Y-axis coordinate value representing the length from the origin to the vertex in the Y-axis direction. The unit of the lengths is, for example, "millimeter".

In the example of FIG. 1, the acquiring unit 401 receives from the designing apparatus 201, the coordinate values of the vertexes P21 to P26 of the signal wire L2 in the wiring layer produced by the designing apparatus 201; and also receives from the checking apparatus 202, the coordinate values measured by the checking apparatus 202, among intersections on the edges of the glass fiber bundles of the glass fiber bundle group acquired by projecting in the direction for the glass fiber bundle group to be stacked, the glass fiber bundle group in the insulation layer to be actually used.

The data acquired is stored to a storage area such as, for example, the RAM 303, the magnetic disk 305, or the optical disk 307. Thereby, the detecting unit 402 can detect the non-overlapping point S in the direction for the signal wire and the glass fiber bundle group to be stacked, based on the position information for the signal wire and the position information for the glass fiber bundle group acquired by the acquiring unit 401.

In this example, the position information for the signal wire is produced by the designing apparatus 201. However, the production thereof is not limited hereto. For example, the design support apparatus 203 may produce the position information for the signal wire in the wiring layer. In this case, the acquiring unit 401 acquires, for example, the position information for the signal wire in the wiring layer produced by the design support apparatus 203. In the example, the position information for the glass fiber bundle group is measured by the checking apparatus 202. However, the measurement thereof is not limited hereto. For example, the design support apparatus 203 may measure the position information for the glass fiber bundle group acquired by projecting in the direction for the glass fiber bundle group to be stacked, the glass fiber bundle group in the insulation layer to be actually used. In this case, the acquiring unit 401 acquires the position information measured by the design support apparatus 203, among the glass fiber bundle group acquired by projecting in the direction for the glass fiber bundle group to be stacked, the glass fiber bundle group in the insulation layer to be actually used.

The detecting unit 402 detects the non-overlapping point S in the direction for the signal wire and the fiber bundle group to be stacked, based on the position information for the signal wire and the position information for the fiber bundle group. For example, the detecting unit 402 detects the information that indicates the non-overlapping point S in the direction for the signal wire and the fiber bundle group to be stacked, based on the coordinate values of the vertexes of the signal wire acquired by the acquiring unit 401 and the intersections on the edges of the glass fiber bundles of the glass fiber bundle group. The information indicating the non-overlapping point S is, for example, the coordinate values of the vertexes of the non-overlapping point S. The data detected is stored in a storage area such as, for example, the RAM 303, the magnetic disk 305, or the optical disk 307. Thereby, the identifying unit 403 can identify the position information for the signal wire portion based on the non-overlapping point S detected by the detecting unit 402.

The identifying unit 403 identifies the position information for the signal wire portion that includes the non-overlapping point S detected by the detecting unit 402 of the signal wire, based on the position information for the signal wire. In the example of FIG. 1, the identifying unit 403 identifies the coordinate values of the points P21, P22, P23, and P26 included in the signal wire portion L21 that includes the non-overlapping point S detected by the detecting unit 402 and that is disposed in a wiring direction. The data identified is stored in a storage area such as, for example, the RAM 303, the magnetic disk 305, or the optical disk 307. Thereby, the converting unit 404 can convert the position information for the signal wire portion identified by the identifying unit 403.

The converting unit 404 converts the position information for the signal wire portion identified by the identifying unit 403 into the position information for the position in the area G of the fiber bundles such that the signal wire portion is included in the area identified from the position information for the fiber bundles that are parallel to the wiring direction of the signal wire portion of the fiber bundle group. In the example of FIG. 1, the converting unit 404 employs as the amount of variation the length Y that is "Y=2" spanning from the left edge of the signal wire portion L21 of the signal wire L2 that includes the non-overlapping point S to the left edge of the glass fiber bundle that is parallel to the signal wire portion L21 and that is close thereto. The converting unit 404 converts the position information for the signal wire L2 into the position information for the position in the area G of the glass fiber bundles by adding the amount of variation Y that is "Y=2" to the X-axis coordinate values of the points P21, P22, P23, and P26 included in the signal wire portion L21 identified by the identifying unit 403.

The converting unit 404 may identify the coordinate values of the intersections present on the left edge of the glass fiber bundle of the intersections of the glass fiber bundle group, and may convert the coordinate values of the points present on the left edge of the signal wire portion L21 into the coordinate values of the intersections identified. The converting unit 404 converts the coordinate values of the points present on the right edge of the signal wire portion L21 into the coordinate values acquired by adding the line width of the signal wire to the X-axis coordinates of the points present on the left edge. The converting unit 404 converts the position information for the signal wire L2 into the position information for the position in the area G of the glass fiber bundle. The data converted is stored in a storage area such as, for example, the RAM 303, the magnetic disk 305, or the optical disk 307. Thereby, the manufacturing apparatus 204 can manufacture the substrate according to the position information for the signal wire that is converted by the converting unit 404.

The converting unit 404 may output the position information that has been converted. The form of the output can be, for example, display on the display 308, output to the printer 313 for printing, and transmission by the I/F 309 to an external apparatus. The external apparatus is, for example, the manufacturing apparatus 204. The form of the output can also be the storage to a storage area such as the RAM 303, the magnetic disk 305, or the optical disk 307. Thereby, the manufacturing apparatus 204 can acquire the position information from the converting unit 404.

A function will be described that is used in a case where the design support apparatus 203 determines the position of the signal wires for differential wiring that are disposed on a given insulation layer. When the interval between the pair of signal wires is larger than the interval between the glass fiber bundles that are parallel to the signal wires, the design support apparatus 203 determines the position without changing the line width of and the interval between the pair of signal wires. On the other hand, when the interval between the pair of signal wires is less than or equal to the interval between the glass fiber bundles that are parallel to the signal wires, the design support apparatus 203 determines the position by changing the line width of and the interval between the pair of signal wires.

A function of the design support apparatus 203 will first be described that is used when the design support apparatus 203 determines the position without changing the line width and the interval. This function is implemented by the acquiring unit 401, the detecting unit 402, the identifying unit 403, and the converting unit 404.

When the signal wire is a given signal wire among the differential signal wires, the acquiring unit 401 acquires the position information for the other signal wire of the differential signal wires. The "differential signal wires" refer to a pair of signal wires that are differentially wired. In the example of FIG. 1, when the signal wires L1 and L2 are differential signal wires, the acquiring unit 401 receives from the designing apparatus 201, the coordinate values of the vertexes that are of the signal wire L1 in the wiring layer and produced by the designing apparatus 201. Thereby, the identifying unit 403 can identify the position information for the signal wire portion of the other signal wire among the differential signal wires acquired by the acquiring unit 401.

The identifying unit 403 identifies the position information for the signal wire portion of the other signal wire that is parallel to the signal wire portion of the given signal wire, of the other signal wire based on the position information for the other signal wire. In the example of FIG. 1, the identifying unit 403 identifies the coordinate values of the points P11, P12, P13, and P16 that are included in the signal wire portion of the signal wire L1 that is parallel to the signal wire portion of the signal wire L2 of the vertexes of the signal wire L1. Thereby, the identifying unit 403 can identify the signal wire portion of the other signal wire whose position information is converted with the interval between the signal wires maintained, associated with the conversion of the position information for the signal wire portion of the given signal wire of the differential wires.

Maintaining the interval between the signal wire portion of the given signal wire and the signal wire portion of the other signal wire, the converting unit 404 converts the position information for the signal wire portion of the other signal wire into candidate position information for the signal wire portion of the other signal wire using the amount of variation used for the signal wire portion of the given signal wire. In the example of FIG. 1, the converting unit 404 adds the amount of variation Y that is "Y=2" used for the signal wire L2 to each of the X-axis coordinate values of the points P11, P12, P13, and P16 of the signal wire L1 identified by the identifying unit 403 and thereby, converts the coordinate values of the points into candidate coordinate values. Thereby, the detecting unit 402 can detect the non-overlapping point S of the other signal wire and the area G of the glass fiber bundles.

The detecting unit 402 detects the non-overlapping point S of the candidate signal wire portion of the other signal wire and the fiber bundle group in the direction for the other signal wire and the fiber bundle group to be stacked, based on candidate position information for the signal wire portion of the other signal wire and the position information for the fiber bundle group. In the example of FIG. 1, the detecting unit 402 detects the non-overlapping point S of the signal wire L1 and the area G of the glass fiber bundles acquired after the coordinate values of the points P11, P12, P13, and P16 are converted into the candidate coordinate values. For example, when the coordinate values of the points P11, P12, P13, and the P16 included in the signal wire portion of the signal wire L1 are the coordinate values in the area G of the glass fiber bundles, the detecting unit 402 does not detect the non-overlapping point S because the signal wire L1 is included in the area of the glass fiber bundles. Thereby, the converting unit 404 can determine whether the converting unit 404 determines the position information for the converted other signal wire.

When the non-overlapping point S is not detected for the signal wire portion of the other signal wire, the converting unit 404 determines the candidate position information for the signal wire portion of the other signal wire as the position information for the signal wire portion of the other signal wire. In the example of FIG. 1, when the detecting unit 402 does not detect the non-overlapping point S, the converting unit 404 determines the candidate coordinate values of the signal wire L1 converted, as the coordinate values of the points P11, P12, P13, and P16 of the signal wire L1.

A function of the design support apparatus 203 will be described that is used when the design support apparatus 203 determines the position by changing the line widths and the interval. This function is implemented by the acquiring unit 401, the detecting unit 402, the identifying unit 403, and the converting unit 404.

When the non-overlapping point S is detected for the signal wire portion of the other signal wire, the converting unit 404 converts the position information for the signal wire portion of the given signal wire and that of the other signal wire into position information for the positions in the area of the fiber bundles, maintaining the differential impedance concerning the signal wire portion of the given signal wire and that of the other signal wire, such that the line width of the signal wire portion of the given signal wire, that of the other signal wire, and the interval therebetween are increased.

For example, the converting unit 404 determines the interval between the signal wires L1 and L2 as the width of the glass fiber bundle running in parallel thereto, such that the signal wires L1 and L2 are included in the area G of the glass fiber bundles. For the determined interval between the signal wires L1 and L2, the converting unit 404 calculates the line width of the differential signal wires whose differential impedance is 100 [Ω] using the calculation equation of the differential impedance. The converting unit 404 converts the position information for the signal wires L1 and L2 into the position information for the position in the area G of the glass fiber bundles, such that the line width of and the interval between the signal wires L1 and L2 become the calculated line width and the interval. Thereby, the manufacturing apparatus 204 can manufacture the substrate according to the position information converted by the converting unit 404.

A function will be described that is used when the design support apparatus 203 determines the position of the signal wire for the single-end wiring that is disposed between two insulation layers. The function used when the design support apparatus 203 determines the position of the signal wire for the single-end wiring that is disposed on a given insulation layer between the two insulation layers is implemented by the acquiring unit 401, the detecting unit 402, the identifying unit 403, and the converting unit 404.

The acquiring unit 401 acquires the position information for the signal wire in the wiring layer and the position information for a first fiber bundle group acquired by projecting, in the direction for the first fiber bundle group to be stacked, the first fiber bundle group in a first insulation layer stacked on the wiring layer. The acquiring unit 401 acquires the position information for a second fiber bundle group acquired by projecting, in the direction for the second fiber bundle group to be stacked, the second fiber bundle group in a second insulation layer stacked on the wiring layer. For example, the acquiring unit 401 receives from the designing apparatus 201, the coordinate values of the vertexes of the signal wire L1 in the wiring layer produced by the designing apparatus 201. For example, the acquiring unit 401 receives from the checking apparatus 202, the coordinate values of the intersections on the edges of the glass fiber bundles of the glass fiber bundle group acquired by projecting, in the direction for the glass fiber bundles to be stacked, the glass fiber bundle group in the two insulation layers stacked sandwiching the wiring layer measured by the checking apparatus 202.

The data acquired is stored in a storage area such as, for example, the RAM 303, the magnetic disk 305, or the optical disk 307. Thereby, the detecting unit 402 can detect the non-overlapping point S of the signal wires and the glass fiber bundle group in the direction for the signal wires and the glass fiber bundle group to be stacked, based on the position information for the signal wires and the position information for the glass fiber bundle group acquired by the acquiring unit 401.

The position information for the signal wire is produced by the designing apparatus 201 in the description above. However, the production of the position information is not limited hereto. For example, the design support apparatus 203 may produce the position information for the signal wire in the wiring layer. In this case, for example, the acquiring unit 401 acquires the position information for the signal wire in the wiring layer produced by the design support apparatus 203. The position information for the glass fiber bundle group is measured by the checking apparatus 202 in the description above. However, the measurement is not limited hereto. For example, the design support apparatus 203 may measure the position information for the glass fiber bundle group acquired by projecting, in the direction for the group to be stacked, the glass fiber bundle group in the insulation layer to be actually used. In this case, the acquiring unit 401 acquires the position information measured by the design support apparatus 203 of the glass fiber bundle group acquired by projecting, in the direction for the glass fiber bundles to be stacked, the glass fiber bundle group in the insulation layer to be actually used.

The detecting unit 402, based on the position information for the signal wire, the first fiber bundle group, and the second fiber bundle group, detects the non-overlapping point S of the signal wire and the first or the second fiber bundle group in the direction for the signal wire and the first or the second fiber bundle group to be stacked. For example, the detecting unit 402 detects the information indicating the non-overlapping point S of the signal wire L2 and the glass fiber bundle group in the given insulation layer in the direction for the signal wire L2 and the glass fiber bundle group to be stacked, and also detects the information indicating the non-overlapping point S of the signal wire L2 and the other glass fiber bundle group in the given insulation layer in the direction for them to be stacked. The information indicating the non-overlapping point S is, for example, the coordinates of the vertexes of the non-overlapping point S.

The data detected is stored in a storage area such as, for example, the RAM 303, the magnetic disk 305, or the optical disk 307. Thereby, the identifying unit 403 can identify the position information for the signal wire portion based on the non-overlapping point S detected by the detecting unit 402.

The identifying unit 403 identifies the position information for the signal wire portion that includes the non-overlapping point S detected by the detecting unit 402 of the signal wire, based on the position information for the signal wire. For example, the identifying unit 403 identifies the coordinate values of the points P21, P22, P23, and P26 included in the signal wire portion L21 that includes the non-overlapping point S detected in the signal wire L2 by the detecting unit 402 and that is disposed in a wiring direction. The data identified is stored to a storage area such as, for example, the RAM 303, the magnetic disk 305, or the optical disk 307. Thereby, the converting unit 404 can convert the position information for the signal wire portion identified by the identifying unit 403.

The converting unit 404 converts the position information for the signal wire portion identified by the identifying unit 403 into the position information for the position in the area G of the first and the second fiber bundles such that the signal wire is included in the area identified by the position information for the first fiber bundle that is parallel to the wiring direction of the signal wire portion of the first fiber bundle group, and the area identified by the position information for the second fiber bundle parallel to the wiring direction of the signal wire portion of the second fiber bundle group.

For example, the converting unit 404 employs as the amount of variation, the length spanning from the left edge of the signal wire portion L21 of the signal wire L2 that includes the non-overlapping point S to the left edge of an overlapping area of the glass fiber bundle that is parallel to the signal wire portion L21 and that is close thereto. The converting unit 404 converts the position information for the signal wire L2 into the position information for the position in the overlapping area of the glass fiber bundles by adding the amount of variation to the X-axis coordinate values of the points P21, P22, P23, and P26 included in the signal wire portion L21 identified by the identifying unit 403. The converted data is stored to a storage area such as, for example, the RAM 303, the magnetic disk 305, or the optical disk 307. Thereby, the manufacturing apparatus 204 can manufacture the substrate according to the position information for the signal wire converted by the converting unit 404.

A function will be described that is used in a case where the design support apparatus 203 determines the position of the differentially wired signal wires disposed between the two insulation layers. When the interval between the pair of signal wires is larger than the interval between the glass fiber bundles that are in parallel thereto, the design support apparatus 203 determines the position without changing the line widths of and the interval between the pair of signal wires. On the other hand, when the interval between the pair of signal wires is less than or equal to the interval between the glass fiber bundles that are in parallel thereto, the design support apparatus 203 determines the position by changing the line widths of and the interval between the pair of signal wires.

A function of the design support apparatus 203 will first be described that is used when the design support apparatus 203 determines the position without changing the line widths and the interval. This function is implemented by the acquiring unit 401, the detecting unit 402, the identifying unit 403, and the converting unit 404.

When the signal wire is a given signal wire of the differential signal wires, the acquiring unit 401 acquires the position information for the other signal wire of the differential signal wires. For example, when the signal wires L1 and L2 are differential signal wires, the acquiring unit 401 receives from the designing apparatus 201, the coordinate values of the vertexes of the signal wire L1 in the wiring layer that are produced by the designing apparatus 201. Thereby, the identifying unit 403 can identify the position information for the signal wire portion of the other signal wire of the differential signal wires acquired by the acquiring unit 401.

The identifying unit 403 identifies the position information for the signal wire portion of the other signal wire that is parallel to the signal wire portion of the given signal wire, of the other signal wire based on the position information for the other signal wire. For example, the identifying unit 403 identifies the coordinate values of the points P11, P12, P13, and P16 that are included in the signal wire portion of the signal wire L1 that is parallel to the signal wire portion of the signal wire L2, among the vertexes of the signal wire L1. The identifying unit 403 can identify the signal wire portion of the other signal wire whose position information is converted with the interval between the signal wires maintained, associated with the conversion of the position information for the signal wire portion of the given signal wire of the differential wires.

Maintaining the interval between the signal wire portion of the given signal wire and the signal wire portion of the other signal wire, the converting unit 404 converts the position information for the signal wire portion of the other signal wire into the candidate position information for the signal wire portion of the other signal wire using the amount of variation used for the signal wire portion of the given signal wire. The converting unit 404 adds the amount of variation used for the signal wire L2 to each of the X-axis coordinate values of the points P11, P12, P13, and P16 of the signal wire L1 identified by the identifying unit 403 and thereby, converts the coordinate values of the points into the candidate coordinate values. Thereby, the detecting unit 402 can detect the non-overlapping point S of the other signal wire and the area G of the glass fiber bundles.

The detecting unit 402 detects the non-overlapping point S of the candidate signal wire portion of the other signal wire and the first or the second fiber bundle group in the direction for the other signal wire and the first or the second fiber bundle group to be stacked, based on the candidate position information for the signal wire portion of the other signal wire and the position information for the first and the second fiber bundle groups. For example, the detecting unit 402 detects the non-overlapping point S of the signal wire L1 and the area G of the glass fiber bundles acquired after the coordinate values of the points P11, P12, P13, and P16 are converted into the candidate coordinate values. For example, when the coordinate values of the points P11, P12, P13, and the P16 included in the signal wire portion of the signal wire L1 are the coordinate values in the area G of the glass fiber bundles, the detecting unit 402 does not detect the non-overlapping point S because the signal wire L1 is included in the area of the glass fiber bundles. Thereby, the converting unit 404 can determine whether the converting unit 404 determines the position information for the other signal wire converted.

When the non-overlapping point S is not detected for the signal wire portion of the other signal wire, the converting unit 404 determines the candidate position information for the signal wire portion of the other signal wire as the position information for the signal wire portion of the other signal wire. For example, when the detecting unit 402 does not detect the non-overlapping point S, the converting unit 404 determines the candidate coordinate values of the signal wire L1 converted as the coordinate values of the points P11, P12, P13, and P16 of the signal wire L1. Thereby, the manufacturing apparatus 204 can manufacture the substrate according to the position information for the signal wire converted by the converting unit 404.

A function of the design support apparatus 203 will be described that is used when the design support apparatus 203 determines the position by changing the line widths and the interval. This function is implemented by the acquiring unit 401, the detecting unit 402, the identifying unit 403, and the converting unit 404.

When the non-overlapping point S is detected for the signal wire portion of the other signal wire, the converting unit 404 converts the position information for the signal wire portion of the given signal wire and of the other signal wire into the position information for the position in the area G of each of the first and the second fiber bundles, maintaining the differential impedance concerning the signal wire portion of the given signal wire and that of the other signal wire, such that the line width of the signal wire portion of the given signal wire, the line width of the other signal wire, and the interval therebetween are increased.

For example, the converting unit 404 calculates the line widths of and the interval between the differential signal wires whose differential impedance is 100 [$\Omega$] using the calculation equation of the differential impedance. The converting unit 404 converts the position information for each of the signal wires L1 and L2 into the position information for the position in the area G of the glass fiber bundles, such that the line widths of and the interval between the signal wires L1 and L2 become the calculated line widths and the interval. Thereby, the manufacturing apparatus 204 can manufacture the substrate according to the position information converted by the converting unit 404.

A function of the manufacturing apparatus 204 will be described. The manufacturing apparatus 204 includes a forming unit 405 and a stacking unit 406. Functions of the forming unit 405 and the stacking unit 406 are implemented by, for example, causing the CPU 301 to execute programs stored in the storing apparatus such as, for example, the ROM 302, the RAM 303, the magnetic disk 305, or the optical disk 307 or by using the I/F 309 that are depicted in FIG. 3.

The forming unit 405 forms the signal wire after the conversion in the wiring layer, based on the position information for the signal wire after the conversion that is acquired by converting the position information for the signal wire portion by the converting unit 404. For example, the forming unit 405 peels off the copper foil spreading off the position of the signal wire determined by the design support apparatus 203 of the copper foil to be the wiring layer stacked on the core material. Thereby, the forming unit 405 can dispose the signal wire at the position determined by the design support apparatus 203.

The stacking unit 406 stacks the wiring layer having the signal wires after the conversion formed therein by the forming unit 405, and the insulation layer with each other. For example, the stacking unit 406 pressurizes the core material and the signal wires heating them from above and below using two pressure plates each including a heater. Thereby, the manufacturing apparatus 204 can couple the core material and the signal wires with each other.

The stacking unit 406 may stack the wiring layer having the signal wires after the conversion formed therein by the forming unit 405 with the first and the second insulation layers sandwiching the wiring layer therebetween. For example, the stacking unit 406 stacks the signal wires with the core material and the pre-preg to be the insulation layer sandwiching the signal wires therebetween. The stacking unit 406 pressurizes the core material and the pre-preg stacked with each other heated from above and below using the two pressure plates each including a heater. Thereby, the manufacturing apparatus 204 can couple the core material and the pre-preg with each other sandwiching the signal wires therebetween.

An example of a check executed by the checking apparatus 202 will be described with reference to FIGS. 5 to 7.

Figure 5:
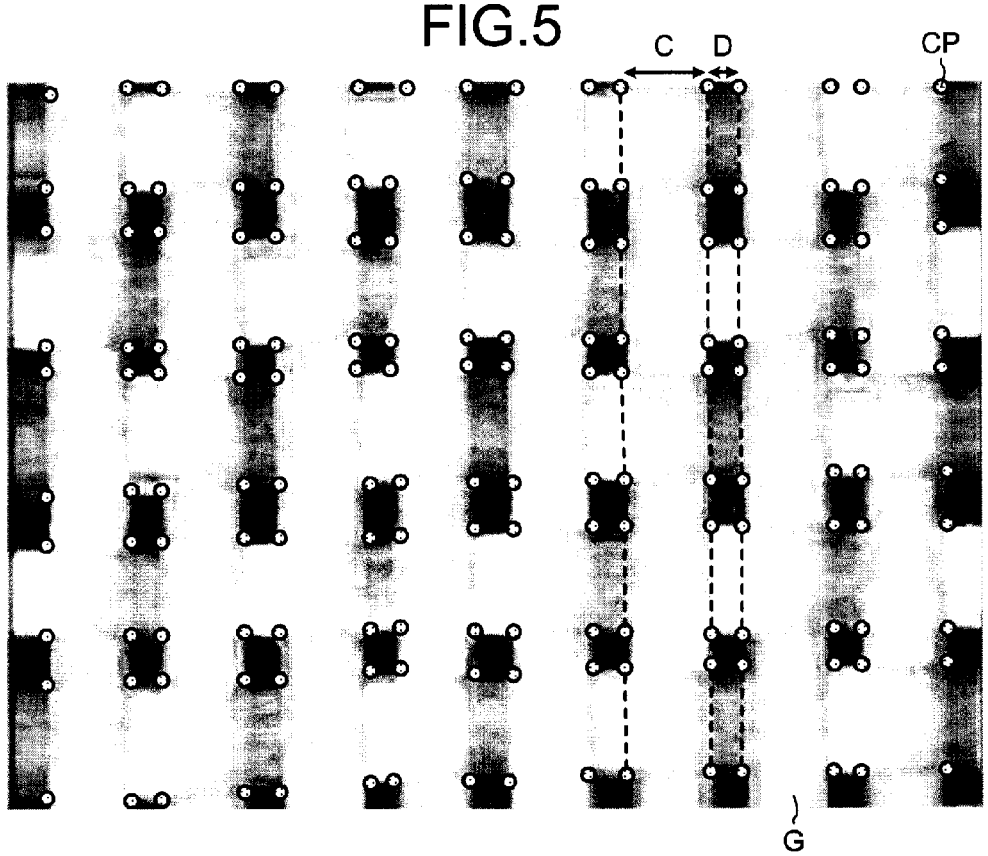
FIGS. 5, 6, and 7 are explanatory diagrams of an example of a check executed by a checking apparatus 202.
Figure 6:
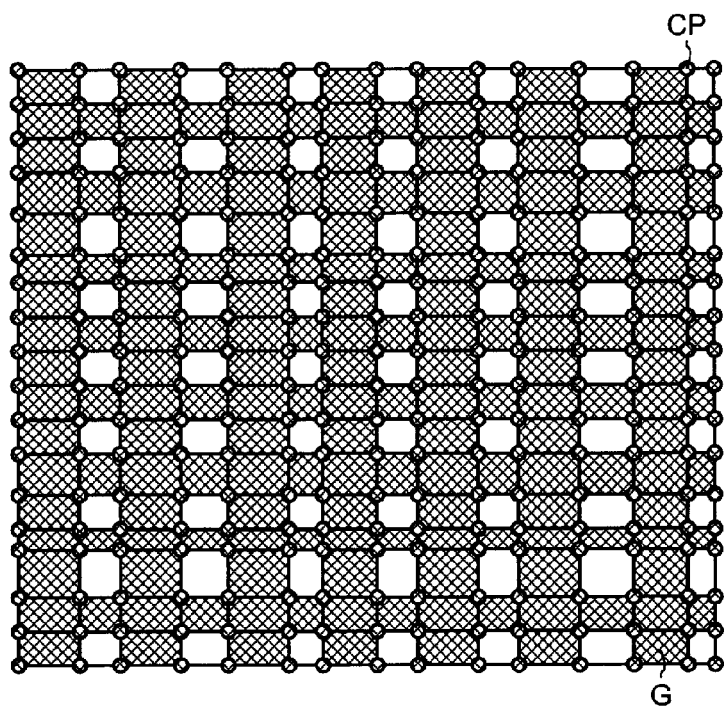
Figure 7:
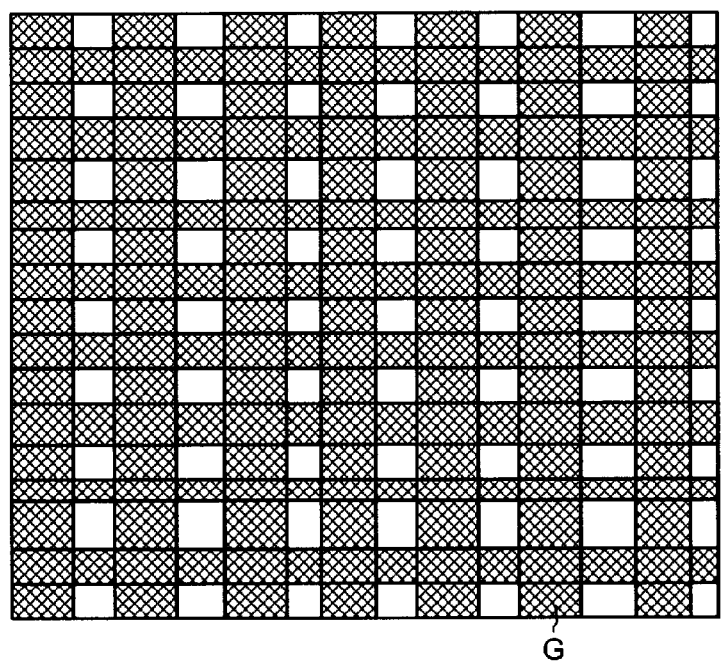

FIGS. 5 to 7 are explanatory diagrams of an example of a check executed by the checking apparatus 202. As depicted in FIG. 5, the checking apparatus 202 applies an X-ray beam or an infrared light beam to the insulation layer and thereby, produces an image whose level of black color indicates the amount transmitted therethrough. The checking apparatus 202 calculates the coordinate values of the intersections CP of the edge of the glass fiber bundles from the image produced.

The checking apparatus 202 detects the area G of the glass fiber bundles by connecting the intersections CP using straight lines. The checking apparatus 202 identifies as an edge of the glass fiber bundle, for example, the straight line connecting a given intersection CP and another intersection CP whose X-axis coordinate or Y-axis coordinate differs from that of the given intersection CP by a threshold value or smaller and whose distance to the given intersection CP is short.

The checking apparatus 202 detects as the area G of the glass fiber bundles, an area whose width is larger than that of each of the areas adjacent thereto, among the areas between the identified edges of the glass fiber bundle. For example, the checking apparatus 202 detects as the area G of the glass fiber bundles, the area whose width C is the larger one among the widths C and D of the areas between the edges.

FIG. 6 depicts the detected area G of the glass fiber bundles. The checking apparatus 202 outputs to the design support apparatus 203 the information that indicates the area G of the glass fiber bundles detected. The information indicating the area G of the glass fiber bundle is, for example, information that indicates the coordinate values of the intersections CP and on which edge of the glass fiber bundles the intersections CP are present. Thereby, the design support apparatus 203 can acquire the position information for the area G of the glass fiber bundles of the insulation layer to be actually used.

The checking apparatus 202 may detect the area G of the glass fiber bundles in the insulation layer by a componential analysis using an X-ray beam or an infrared light beam. FIG. 7 depicts the area G of the glass fiber bundles, detected by the componential analysis. The checking apparatus 202 may output to the design support apparatus 203, the information indicating the area G of the glass fiber bundles. Thereby, the design support apparatus 203 can acquire the position information for the area G of the glass fiber bundles of the insulation layer to be actually used.

Figure 8:
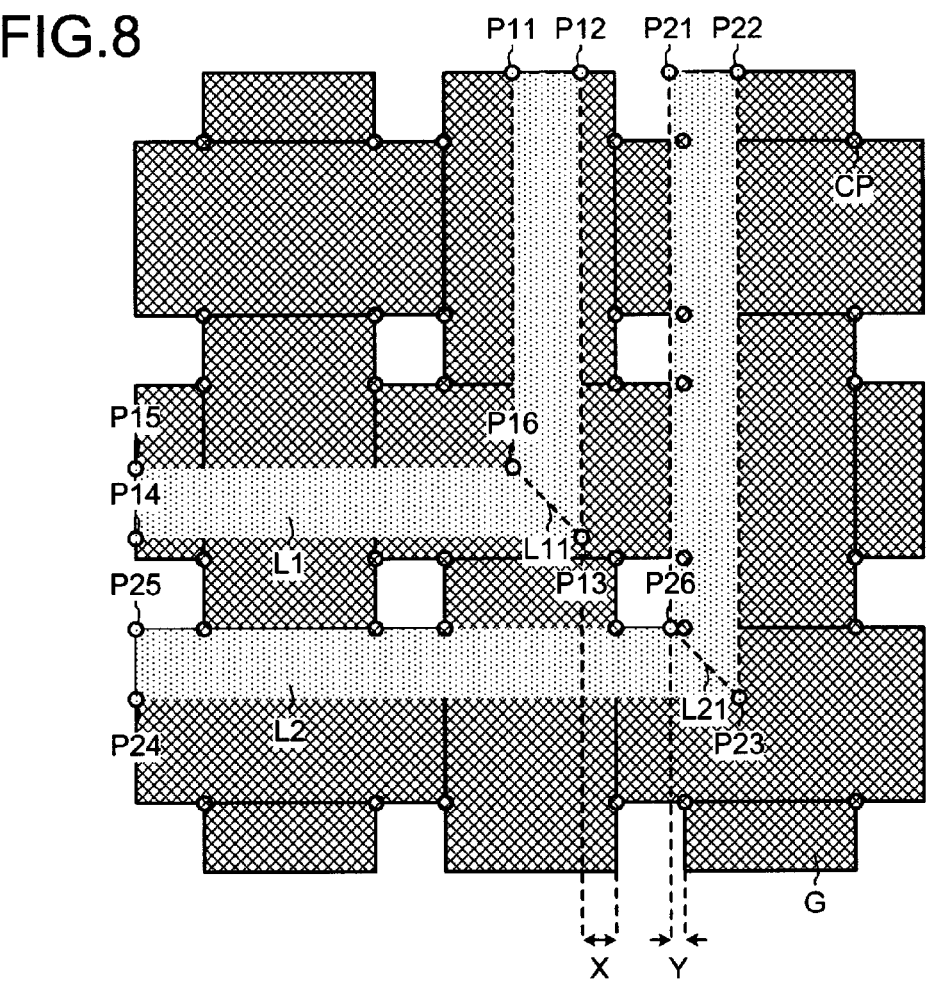
FIGS. 8 and 9 are explanatory diagrams of position conversion examples of differentially wired signal wires executed by the design support apparatus 203 without changing line widths of and the interval between the signal wires.

With reference to FIGS. 8 to 6, an example will be described of a case where the design support apparatus 203 converts the position information for the differentially wired signal wires. For example, the design support apparatus 203 can determine the position of the differentially wired signal wires disposed on a given insulation layer, and can also determine the position of the differentially wired signal wires disposed between two insulation layers.

An example of the case described with reference to FIG. 4 will be described with reference to FIGS. 8 and 9 where the design support apparatus 203 determines the position of the differentially wired signal wires disposed on the given insulation layer without changing the line widths thereof and the interval therebetween.

Figure 9:
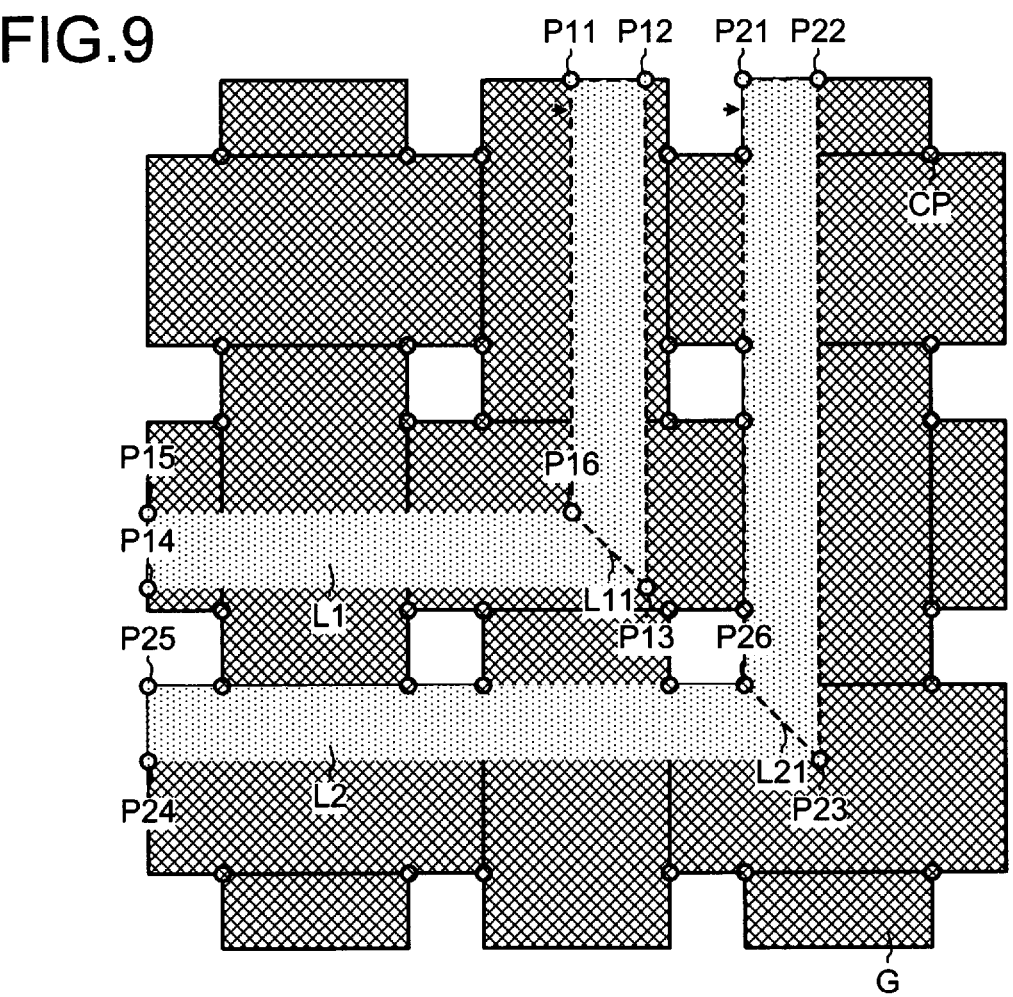

FIGS. 8 and 9 are explanatory diagrams of the position conversion examples of the differentially wired signal wires executed by the design support apparatus 203 without changing the line widths of and the interval between the signal wires. In the example of FIG. 8, according to the position information for each of the signal wires L1 and L2, the signal wire L1 is included in the area G of the glass fiber bundles while the signal wire L2 extends in and out of the agar G of the glass fiber bundles.

The signal wires L1 and L2 are the differentially wired signal wires. Therefore, the design support apparatus 203 determines whether the design support apparatus 203 can convert the position information for the signal wires L1 and L2 into the position information for the position in the area G of the glass fiber bundles without changing the line widths thereof and the interval therebetween.

For example, the design support apparatus 203 calculates a length X spanning from the right edge of a signal wire portion L11 that is parallel to the Y axis of the signal wire L1 to the left edge of the glass fiber bundle that is parallel to the Y axis and that is close to the signal wire L1, and also calculates a length Y spanning from the left edge of the signal wire portion L21 that is parallel to the Y axis of the signal wire L2 to the left edge of the glass fiber bundle that is parallel to the Y axis and that is close to the signal wire L2. If the length X is greater than or equal to the length Y, the design support apparatus 203 determines that the design support apparatus 203 can convert the position information for each of the signal wires L1 and L2 without changing the line widths thereof and the interval therebetween.

In the example of FIG. 8, because the lengths X and Y are "X=5" and "Y=2", the design support apparatus 203 determines that the design support apparatus 203 can convert the position information without changing the line widths of and the interval between the signal wires L1 and L2. The design support apparatus 203 employs the length Y that is "Y=2" as the amount of variation for the coordinate values of the signal wire L2 with which the signal wire L2 can be included in the area G of the glass fiber bundles. The design support apparatus 203 may employ a length from the center line of the signal wire portion L21 that is parallel to the Y axis of the signal wire L2 to the center line of the glass fiber bundle that is parallel to the Y axis and that is close to the signal wire L2.

The design support apparatus 203 adds the amount of variation "Y=2" to the X-axis coordinates of the position information for the signal wire portion L11 that is parallel to the Y axis of the signal wire L1 and the position information for the signal wire portion L21 that is parallel to the Y axis of the signal wire L2. Thereby, the design support apparatus 203 converts the position information for each of the signal wires L1 and L2 into the position information for the position in the area G of the glass fiber bundles.

As depicted in FIG. 9, for example, the design support apparatus 203 adds "2" to the X-axis coordinate value of the coordinate values (38, 0) of the point P11 included in the signal wire portion L11 to convert the coordinate values into (40, 0), adds "2" to the X-axis coordinate value of the coordinate values (43, 0) of the point P12 included therein to convert the coordinate values into (45, 0), also adds "2" to the X-axis coordinate value of the coordinate values (43, 80) of the point P13 included in the signal wire portion L11 to convert the coordinate values into (45, 80), and adds "2" to the X-axis coordinate value of the coordinate values (38, 75) of the point P16 included therein to convert the coordinate values into (40, 75).

For example, the design support apparatus 203 adds "2" to the X-axis coordinate value of the coordinate values (38, 0) of the point P21 included in the signal wire portion L21 to convert the coordinate values into (40, 0), adds "2" to the X-axis coordinate value of the coordinate values (43, 0) of the point P22 included therein to convert the coordinate values into (45, 0), also adds "2" to the X-axis coordinate value of the coordinate values (43, 80) of the point P23 included in the signal wire portion L21 to convert the coordinate values into (45, 80), and adds "2" to the X-axis coordinate value of the coordinate values (38, 75) of the point P26 included therein to convert the coordinate values into (40, 75).

Thereby, the design support apparatus 203 can convert the position information for the signal wire into the position information for the position in the area G of the glass fiber bundles such that the signal wire is included in the area A of the glass fiber bundles. The manufacturing apparatus 204 can form the signal wires L1 and L2 according to the position information converted by the design support apparatus 203 and can dispose the signal wires L1 and L2 in the area G of the glass fiber bundles. The manufacturing apparatus 204 can reduce the insertion loss of each of the signal wires L1 and L2, can maintain the differential impedance of the signal wires L1 and L2 to be constant, and can reduce the skew.

An example of the case described with reference to FIG. 4 will be described with reference to FIGS. 10 to 12 where the design support apparatus 203 determines the position of the differentially wired signal wires to be disposed on the given insulation layer changing the line widths thereof and the interval therebetween.

Figure 10:
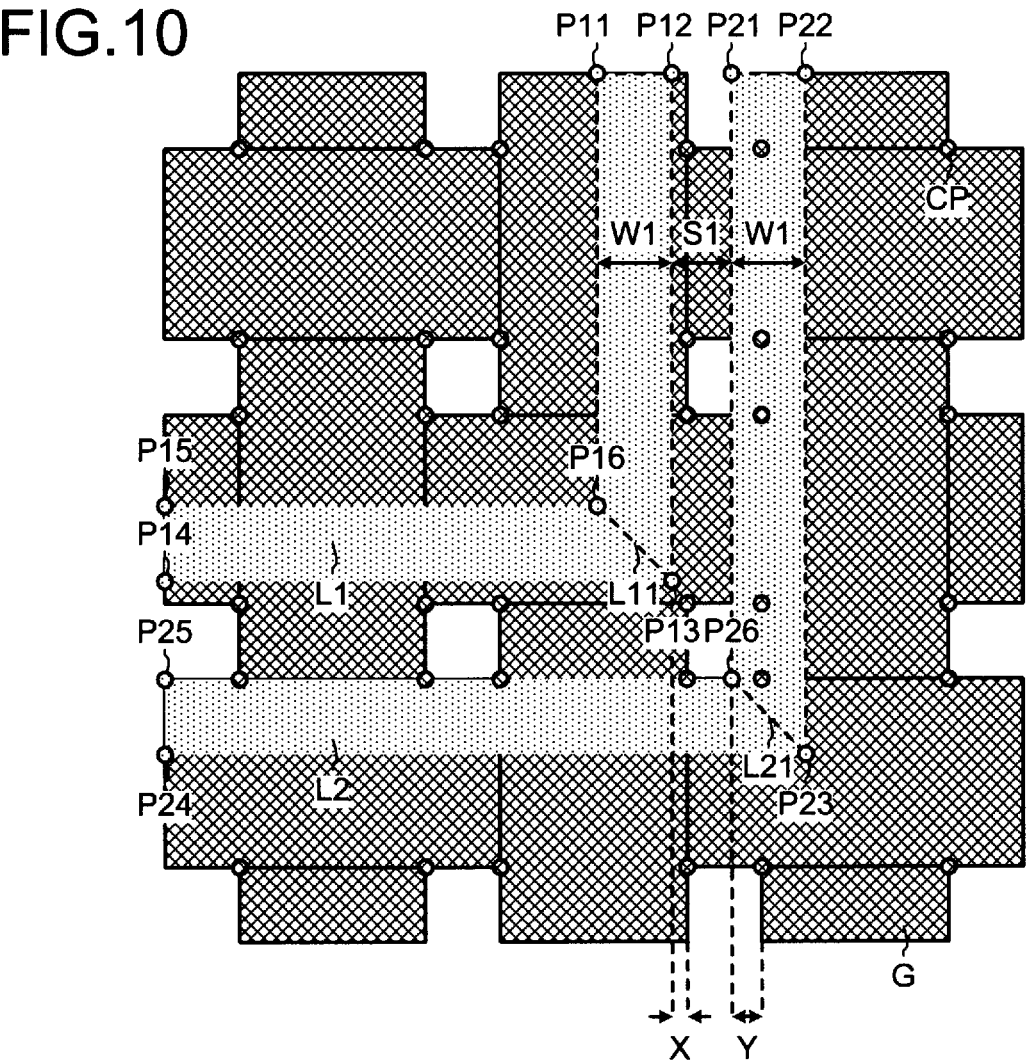
FIGS. 10, 11, and 12 are explanatory diagrams of examples of position conversion executed by the design support apparatus 203 by changing the line widths of and the interval between the signal wires.
Figure 11:
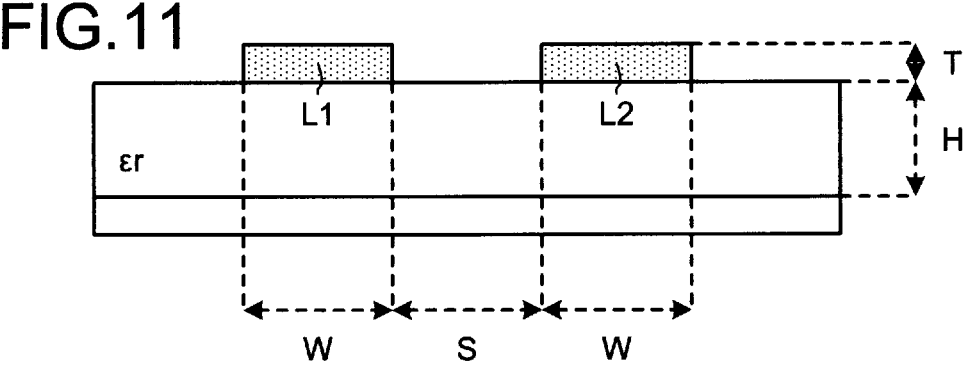
Figure 12:
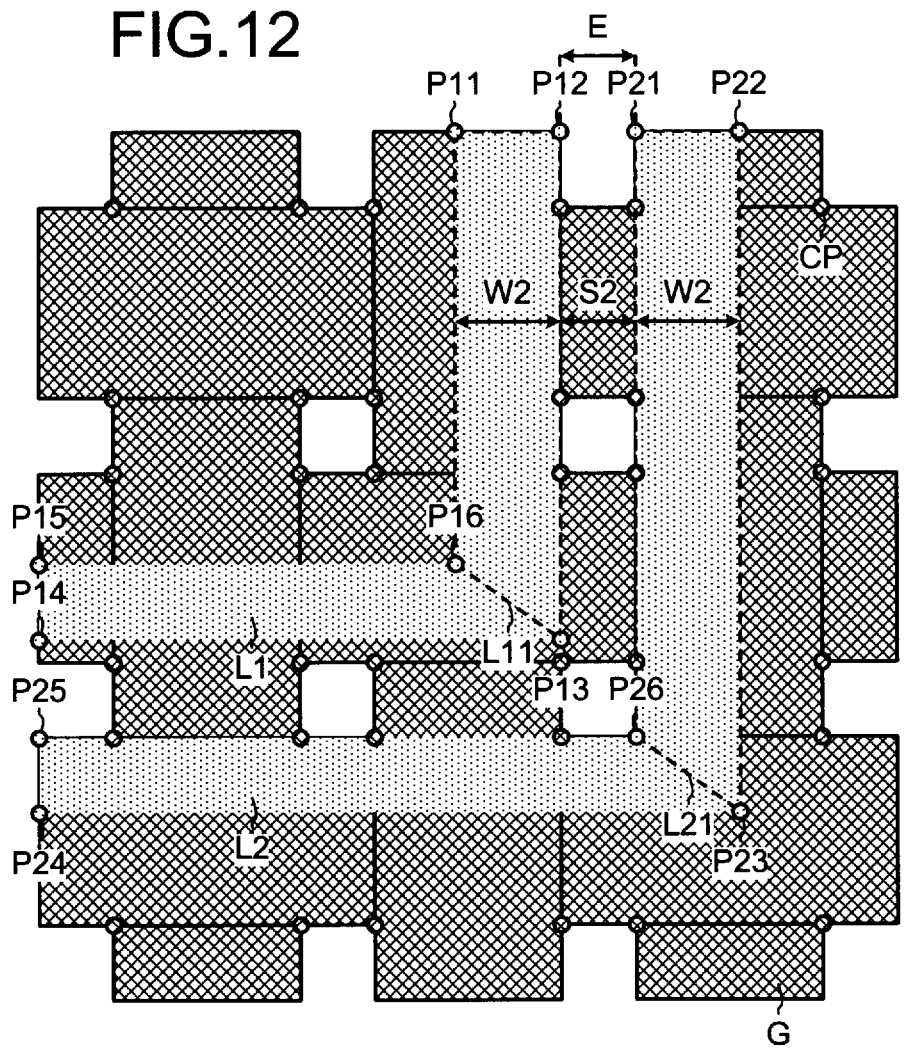

FIGS. 10 to 12 are explanatory diagrams of examples of position conversion executed by the design support apparatus 203 by changing the line widths of and the interval between the differential wired signal wires. In the example of FIG. 10, according to the position information for the signal wires L1 and L2, the signal wire L1 is included in the area G of the glass fiber bundles while the signal wire L2 extends in and out of the area G of the glass fiber bundles.

The signal wires L1 and L2 are differentially wired signal wires. Therefore, the design support apparatus 203 determines whether the design support apparatus 203 can convert the position information for each of the signal wires L1 and L2 into the position information for the position in the area G of the glass fiber bundles without changing line widths W1 of and a interval S1 between the signal wires L1 and L2.

For example, the design support apparatus 203 calculates the length X spanning from the right edge of the signal wire portion L11 that is parallel to the Y axis of the signal wire L1 to the left edge of the glass fiber bundle that is parallel to the Y axis and that is close to the signal wire L1, and also calculates a length Y spanning from the left edge of the signal wire portion L21 that is parallel to the Y axis of the signal wire L2 to the left edge of the glass fiber bundle that is parallel to the Y axis and that is close to the signal wire L2. If the length X is greater than or equal to the length Y, the design support apparatus 203 determines that the design support apparatus 203 can convert the position information for each of the signal wires L1 and L2 without changing line widths W1 thereof and the interval S1 therebetween.

In the example of FIG. 10, because the lengths X and Y are "X=2" and "Y=4", the design support apparatus 203 determines that the design support apparatus 203 can not convert the position information without changing the line widths W1 of and the interval S1 between the signal wires L1 and L2. Therefore, the design support apparatus 203 calculates the line widths of and the interval between the signal wires after the conversion.

The design support apparatus 203 determines the interval between the signal wires such that the signal wires are included in the area G of the glass fiber bundles. The design support apparatus 203 calculates the line widths of the signal wires with which the differential impedance can be maintained to be constant before and after the change of the interval between the signal wires L1 and L2. For example, when the interval between the signal wires is changed to the interval determined, using the calculation equation of the differential impedance, the design support apparatus 203 calculates the line widths of the signal wires with which the differential impedance is 100 [Ω].

As depicted in FIG. 11, when the differentially wired signal wires are disposed on the given insulation layer, the calculation equation of the differential impedance Zdiff is expressed as Eq. (1).

$$Zdiff[\Omega] = 2Z0\left[1 - 0.48e^{-0.96\frac{S}{H}}\right] \quad (1)$$

In Eq. (1), "S" is the interval between the signal wires depicted in FIG. 11. "H" is the height of the insulation layer depicted in FIG. 11. "Z0" is the impedance of the signal wire alone. The calculation equation for the impedance Z0 is Eq. (2).

$$Z0[\Omega] = \frac{60}{\sqrt{0.475\varepsilon r + 0.67}} \ln\left[\frac{4H}{0.67(0.8W + T)}\right] \quad (2)$$

In Eq. (2), "W" is the line widths of the signal wires depicted in FIG. 11. "T" is the height of the signal wires depicted in FIG. 11. "∈r" is the dielectric constant of the insulation layer depicted in FIG. 11. The design support apparatus 203 calculates the line widths and the interval after the change using Eqs. (1) and (2) and progresses to the processing of FIG. 12.

As depicted in FIG. 12, the design support apparatus 203 changes the line widths W1 of and the interval S1 between the signal wire portion L11 parallel to the Y axis of the signal wire L1 and the signal wire portion L21 parallel to the Y axis of the signal wire L2, to line widths W2 and a interval S2 calculated. The design support apparatus 203 converts the position information for each of the signal wires L1 and L2 into the position information for the position in the area G of the glass fiber bundles.

It is assumed that the design support apparatus 203 determines the interval between the signal wires as the interval E between the sides of the glass fiber bundle parallel to each other that is "E=10" and calculates a line width "14" for the signal wires. In this case, for example, the design support apparatus 203 converts the coordinate values of the vertex P12 of the signal wire L1 into the coordinate values (70, 0) on the right side of the glass fiber bundle and converts the coordinate values of the vertex P13 into the coordinate values (68, 67) on the right side of the glass fiber bundle.

The design support apparatus 203 converts the coordinate values of the vertex P11 into (56, 0) acquired by reducing "14" from the X coordinate value of the vertex P12 such that the line width W2 of the signal wire L1 is a line width "14". The design support apparatus 203 also converts the coordinate values of the vertex P16 into (56, 57) acquired by reducing "14" from the X coordinate value of the vertex P13 such that the line width W2 of the signal wire L1 is a line width "14".

The design support apparatus 203 converts the coordinate values of the vertex P21 of the signal wire L2 into (80, 0) acquired by adding "10" to the X coordinate value of the vertex P12 such that the interval between the signal wires L1 and L2 is a interval "10" determined. The design support apparatus 203 converts the coordinate values of the vertex P26 into (80, 80) acquired by adding "10" to the X coordinate value of the vertex P13 such that the interval between the signal wires L1 and L2 is the interval "10" determined.

The design support apparatus 203 converts the coordinate values of the vertex P22 into (94, 0) acquired by adding "14" to the X coordinate value of the vertex P21 such that the line width W2 of the signal wire L2 is the line width "14" calculated. The design support apparatus 203 converts the coordinate values of the vertex P23 into (94, 90) acquired by adding "14" to the X coordinate value of the vertex P26 such that the line width W2 of the signal wire L2 is the line width "14" calculated.

Thereby, the design support apparatus 203 can convert the position information for the signal wire into the position information for the position in the area G of the glass fiber bundles maintaining the differential impedance to be constant, such that the differentially wired signal wires are included in the area G of the glass fiber bundles. The design support apparatus 203 can also reduce the insertion loss of the signal wires by increasing the line widths to maintain the differential impedance.

The manufacturing apparatus 204 can form the signal wires L1 and L2 according to the position information converted by the design support apparatus 203 and can dispose the signal wires L1 and L2 in the area G of the glass fiber bundles. The manufacturing apparatus 204 can reduce the insertion loss of each of the signal wires L1 and L2, can maintain the differential impedance of each of the signal wires L1 and L2 to be constant, and can reduce the skew.

The design support apparatus 203 may determine the interval S2 between the signal wires L1 and L2 to be the interval between the center lines of the glass fiber bundles parallel to each other. The design support apparatus 203 may calculate the line widths W2 of the signal wires L1 and L2 using Eqs. (1) and (2). The design support apparatus 203 may convert the position information for each of the signal wires L1 and L2 into the position information for the position in the area G of the glass fiber bundles such that the center lines of the glass fiber bundles and the center lines of the signal wires L1 and L2 overlap with each other.

An example of the case described with reference to FIG. 4 will be described with reference to FIGS. 13A to 16 where the design support apparatus 203 determines the position of each of the differentially wired signal wires disposed between the two insulation layers.

Figure 13A:
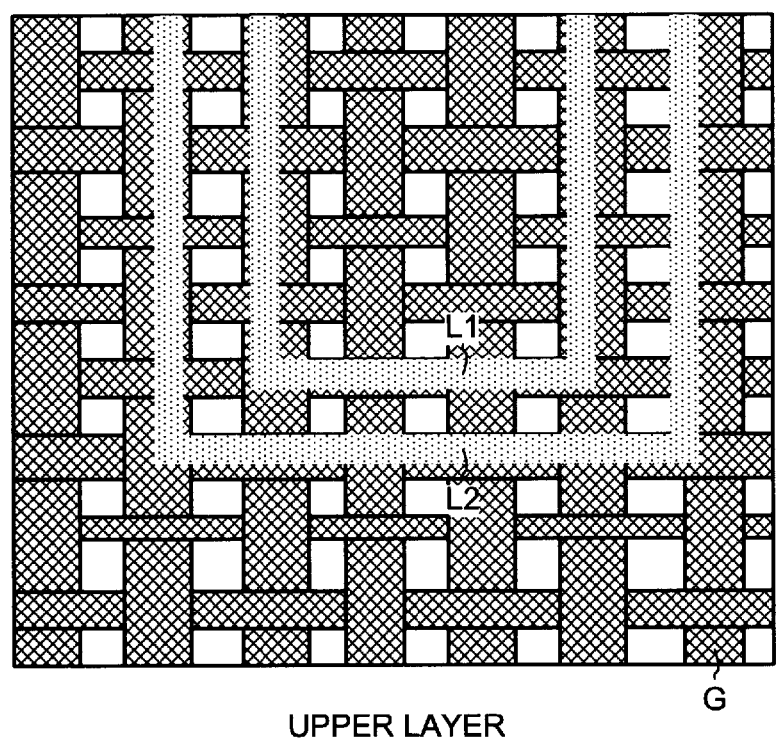
FIGS. 13A, 13B, 14A, 14B, 15A, 15B, and 16 are explanatory diagrams of examples of position conversion of differentially wired signal wires disposed between two insulation layers.
Figure 13B:
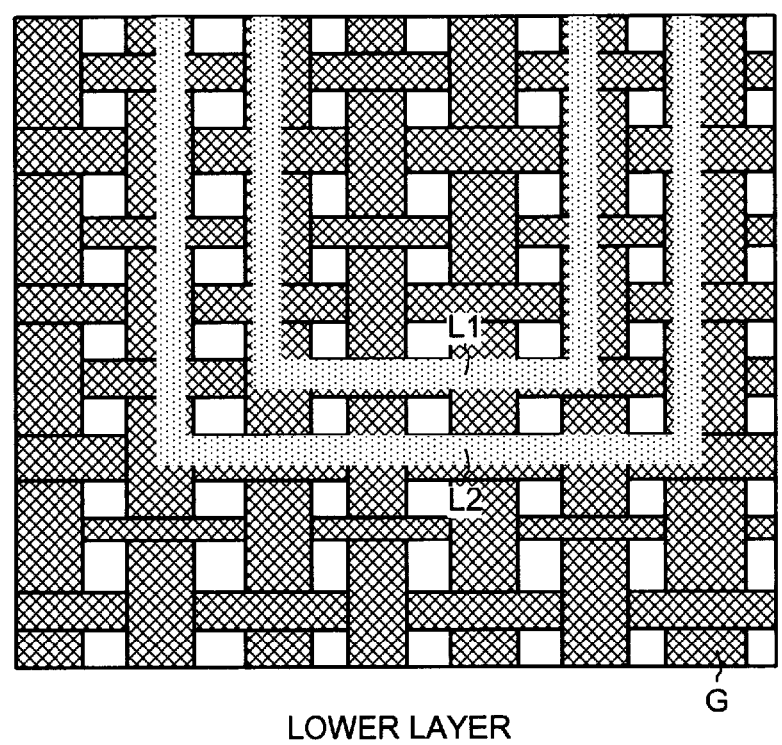

FIGS. 13A to 16 are explanatory diagrams of examples of the position conversion of the differentially wired signal wires disposed between the two insulation layers. In the example of FIGS. 13A and 13B, among the two insulation layers that sandwich the differentially wired signal wires, the area G of the glass fiber bundles in the insulation layer to be an upper layer (FIG. 13A) and the area G of glass fiber bundles in the insulation layer to be a lower layer (FIG. 13B) are different from each other. In this case, the design support apparatus 203 converts the position information for each of the signal wires into the position information for a position in the overlapping area such that the differentially wired signal wires are included in the overlapping area of the area G of the glass fiber bundles in the upper layer and the area G of the glass fiber bundles in the lower layer, to maintain the differential impedance of each of the signal wires to be constant.

Figure 14A:
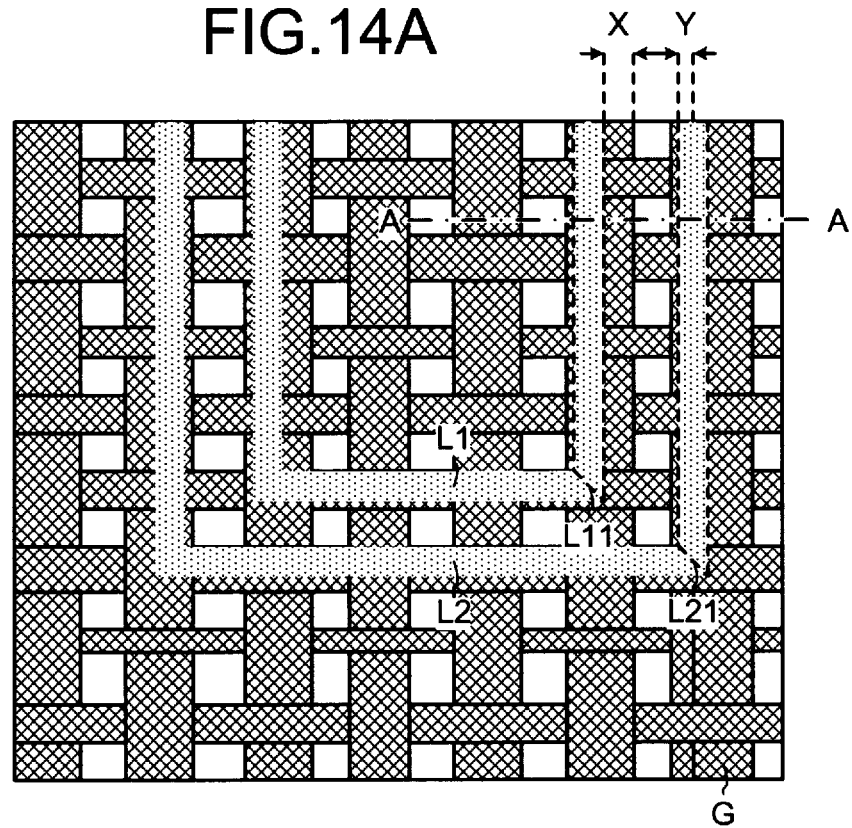
Figure 14B:
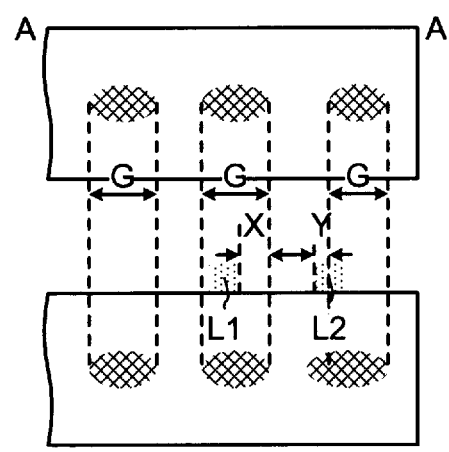

As depicted in FIGS. 14A and 14B, the design support apparatus 203 overlaps the areas G of the glass fiber bundles of the upper and the lower layers with each other and identifies the overlapping area of the glass fiber bundles. The design support apparatus 203 converts the position information for each of the signal wires into the position information for the position in the overlapping area such that the signal wires are included in the overlapping area identified.

The signal wires L1 and L2 are differentially wired signal wires. Therefore, the design support apparatus 203 determines whether the design support apparatus 203 can convert the position information for each of the signal wires L1 and L2 into the position information for the position in the area G of the glass fiber bundles without changing the line widths of and the interval between the signal wires L1 and L2.

For example, the design support apparatus 203 calculates the length X spanning from the right edge of the signal wire portion L11 that is parallel to the Y axis of the signal wire L1 to the right edge of the overlapping area that is parallel to the Y axis and that is close to the signal wire L1, and also calculates the length Y spanning from the left edge of the signal wire portion L21 that is parallel to the Y axis of the signal wire L2 to the left edge of the overlapping area that is parallel to the Y axis and that is close to the signal wire L2. When the length X is greater than or equal to the length Y, the design support apparatus 203 determines that the design support apparatus 203 can convert the position information for each of the signal wires L1 and L2 without changing the line widths thereof and the interval therebetween.

Figure 15A:
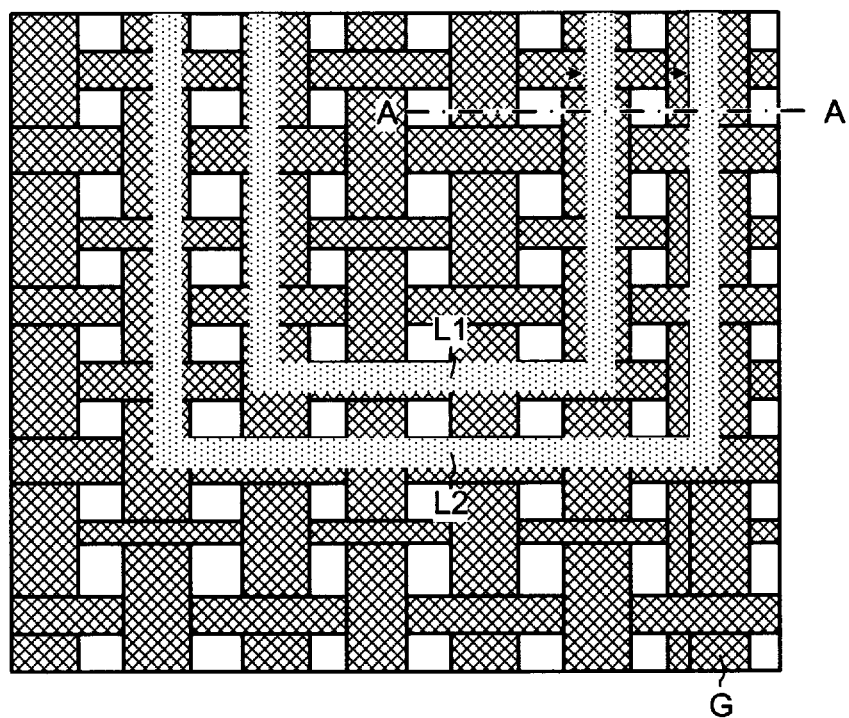
Figure 15B:
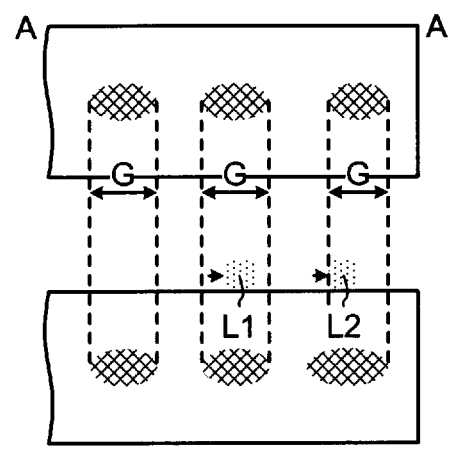

In the example of FIGS. 15A and 15B, similar to FIGS. 8 and 9, the design support apparatus 203 determines that the design support apparatus 203 can convert the position information for each of the signal wires L1 and L2 without changing the line widths thereof and the interval therebetween. The design support apparatus 203 converts the position information for each of the signal wires L1 and L2 into the position information for the position in the overlapping area.

Thereby, the design support apparatus 203 can convert the position information for each of the signal wires into the position information for the position in the area G of the glass fiber bundles such that the signal wires are included in the area G of the glass fiber bundles. The manufacturing apparatus 204 can form the signal wires L1 and L2 according to the position information converted by the design support apparatus 203 and can dispose the signal wires L1 and L2 in the area G of the glass fiber bundles. The manufacturing apparatus 204 can reduce the insertion loss of each of the signal wires L1 and L2, can maintain the differential impedance of the signal wires L1 and L2, and can reduce the skew.

Figure 16:
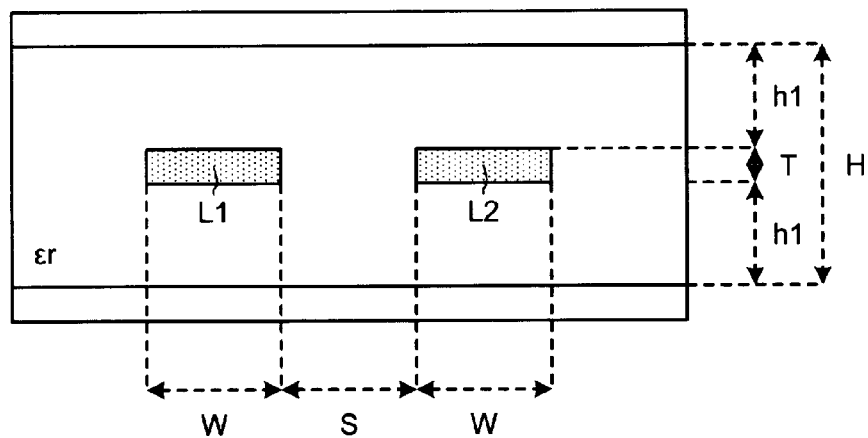

In the example of FIG. 16, the design support apparatus 203 determines that the design support apparatus 203 can not convert the position information without changing the line widths of and the interval between the signal wires L1 and L2. Therefore, the design support apparatus 203 calculates the line widths of and the interval between the signal wires after the conversion.

The design support apparatus 203 determines the interval between the signal wires such that the signal wires are included in the overlapping area of the glass fiber bundles. The design support apparatus 203 calculates the line widths of the signal wires with which the differential impedance can be maintained to be constant, before and after the change of the interval between the signal wires L1 and L2. For example, when the interval between the signal wires is changed to the interval determined using the calculation equation of the differential impedance, the design support apparatus 203 calculates the line widths of the signal wires with which the differential impedance is 100 [Ω].

As depicted in FIG. 16, when the differentially wired signal wires are disposed between the two insulation layers, a calculation equation for the differential impedance is Eq. (3).

$$Zdiff[\Omega] = 2Z0\left[1 - 0.374e^{-2.9\frac{S}{H}}\right] \quad (3)$$

In Eq. (3) above, "S" is the interval between the signal wires depicted in FIG. 16. "H" is the height of the insulation layer depicted in FIG. 16. "Z0" is the impedance of the signal wire alone. A calculation equation for the impedance Z0 is Eq. (4).

$$Z0[\Omega] = \frac{60}{\sqrt{\varepsilon r}} \ln\left[\frac{4H}{0.67(0.8W + T)}\right] \quad (4)$$

In Eq. (4) above, "W" is the line widths of the signal wires depicted in FIG. 16. "T" is the height of the signal wires depicted in FIG. 16. "∈r" is the dielectric constant of the insulation layer depicted in FIG. 16. "h1" is the height from the signal wires to the wiring layer to be the ground.

When the design support apparatus 203 calculates the line width and the interval after the change using Eq. (2), similar to FIG. 12, the design support apparatus 203 changes the line widths of and the interval between the signal wire portion L11 that is parallel to the Y axis of the signal wire L1 and the signal wire portion L21 that is parallel to the Y axis of the signal wire L2, to the calculated line widths and interval. The design support apparatus 203 converts the position information for each of the signal wires L1 and L2 into position information for a position in the overlapping area of the glass fiber bundles.

Thereby, the design support apparatus 203 can convert the position information for each of the differentially wired signal wires into position information for a position in the area G of the glass fiber bundles maintaining the differential impedance to be constant, such that the signal wires are included in the area G of the glass fiber bundles. The design support apparatus 203 can also reduce the insertion loss of each of the signal wires manufactured, by increasing the line widths to maintain the differential impedance to be constant.

The manufacturing apparatus 204 can form the signal wires L1 and L2 according to the position information converted by the design support apparatus 203 and can dispose the signal wires L1 and L2 in the area G of the glass fiber bundles. The manufacturing apparatus 204 can reduce the insertion loss of each of the signal wires L1 and L2, can maintain the differential impedance of each of the signal wires L1 and L2, and can reduce the skew.

Examples of the manufacture by the manufacturing apparatus 204 will be described with reference to FIGS. 17 to 20.

Figure 17:
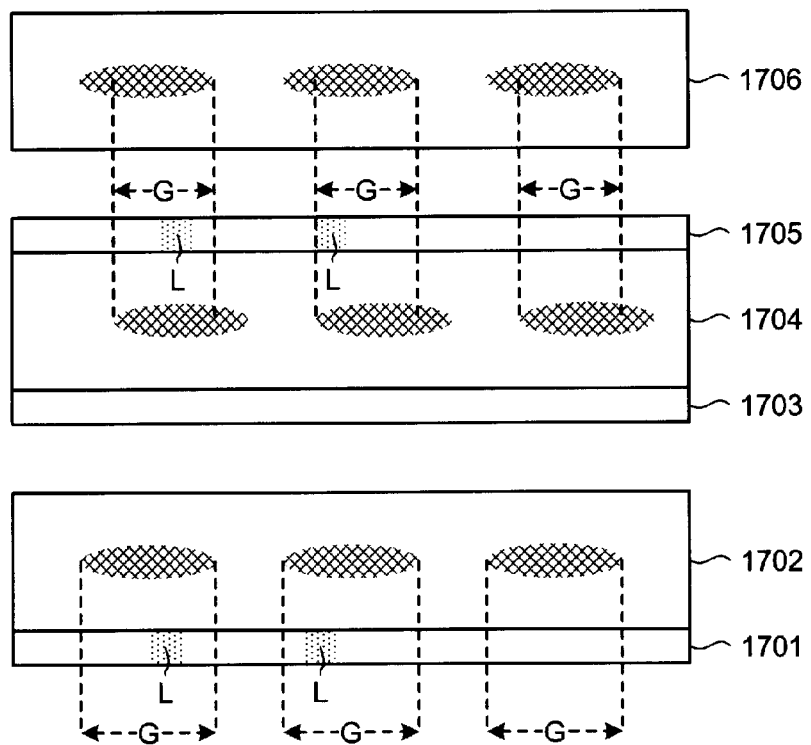

FIGS. 17 to 20 are explanatory diagrams of an example of manufacturing by the manufacturing apparatus 204. In the example of FIG. 17, the manufacturing apparatus 204 manufactures a substrate that is formed by stacking a core material 1704 and pre-pregs 1702 and 1706 each to be an insulation layer, and copper foil 1701, 1703, and 1705 each to be a wiring layer, with each other. The manufacturing apparatus first progresses to a process of FIGS. 18A and 18B.

Figure 18A:
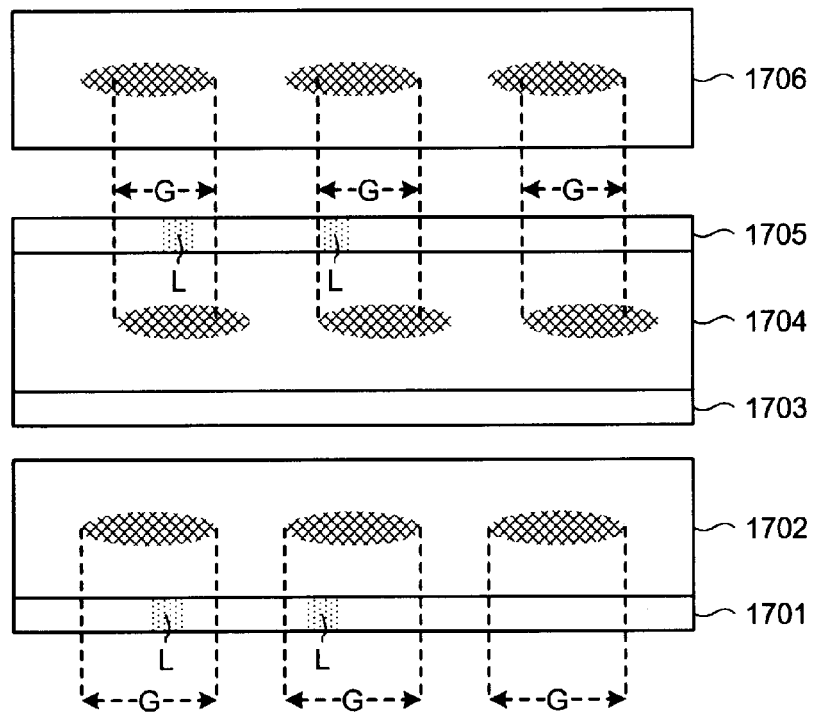
Figure 18B:
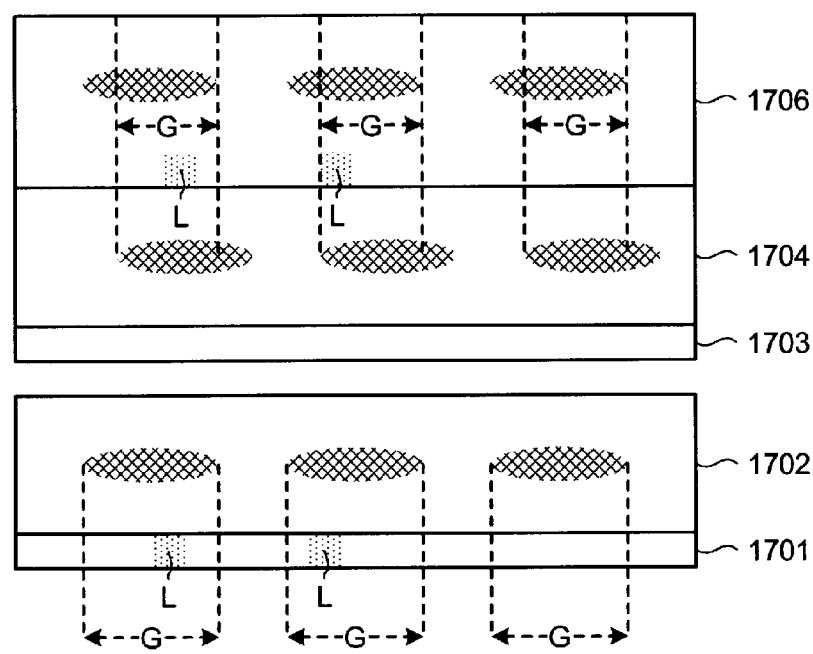

As depicted in FIGS. 18A and 18B, the manufacturing apparatus 204 peels off a portion of the copper foil 1705 spreading off the position of the signal wires L determined by the design support apparatus 203. Thereby, the manufacturing apparatus 204 can dispose the signal wires L at the positions determined by the design support apparatus 203.

The manufacturing apparatus 204 stacks the signal wires L sandwiching the signal wires L with the core material 1704 and the pre-pregs 1706 each to be an insulation layer. The manufacturing apparatus 204 pressurizes the core material 1704 and the pre-preg 1706 that sandwich the signal wires L, heating the core material 1704 and the pre-preg 1706 from above and below using, for example, two pressure plates respectively including a heater. Thereby, the manufacturing apparatus 204 can couple the core material 1704 and the pre-preg 1706 with each other. The manufacturing apparatus 204 progresses to a process depicted in FIGS. 19A and 19B.

As depicted in FIGS. 19A and 19B, the manufacturing apparatus 204 stacks the copper foil 1703 to be the ground, sandwiching the copper foil 1703 using the core material 1704 and the pre-preg 1702 without peeling off the copper foil 1703 to be the wiring layer to use the copper foil 1703 as the ground. For example, the manufacturing apparatus 204 pressurizes the core material 1704 and the pre-preg 1702 that sandwich the copper foil 1703, heating the core material 1704 and the pre-preg 1702 from the above and below using, for example, the two pressure plates respectively including a heater. Thereby, the manufacturing apparatus 204 can couple the core material 1704 and the pre-preg 1702 with each other. The manufacturing apparatus 204 progresses to a process depicted in FIG. 20.

Figure 20:
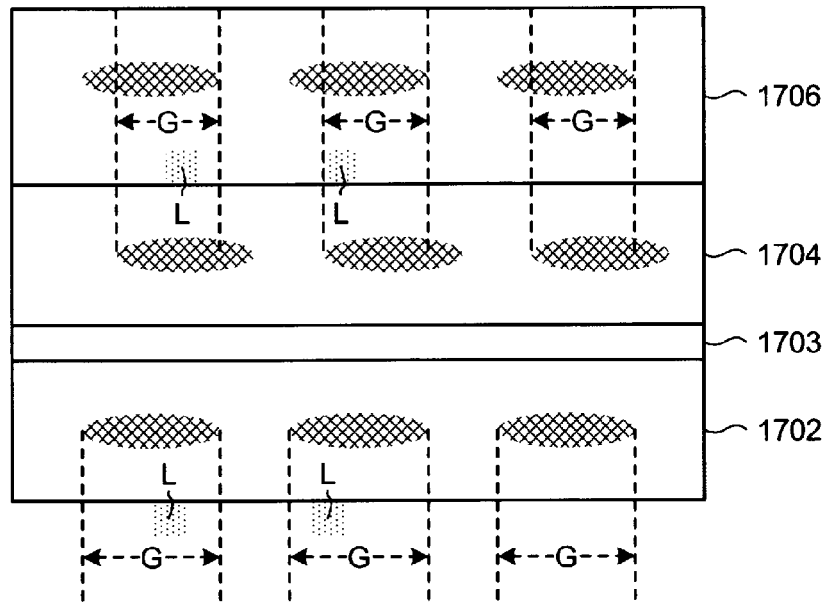

As depicted in FIG. 20, from the copper foil 1701 to be the wiring layer stacked on the pre-preg 1702, the manufacturing apparatus 204 peels off a portion of the copper foil 1701 spreading off the position of the signal wires L determined by the design support apparatus 203. Thereby, the manufacturing apparatus 204 can dispose the signal wires L at the positions determined by the design support apparatus 203.

The manufacturing apparatus 204 pressurizes the pre-preg 1702 and the signal wires L stacked, heating the pre-preg 1702 and the signal wires L from above and below using, for example, the two pressure plates respectively including a heater. Thereby, the manufacturing apparatus 204 can couple the pre-preg 1702 and the signal wires L with each other. The manufacturing apparatus 204 can manufacture the substrate having the signal wires L disposed according to the position information converted by the design support apparatus 203.

Details of a process procedure of a design process executed by the designing apparatus 201 will be described with reference to FIG. 21. The design process is a process of determining the position information for the signal wires such that the signal wires are included in the area of the glass fiber bundles that are in the insulation layer and conform to the specification.

Figure 21:
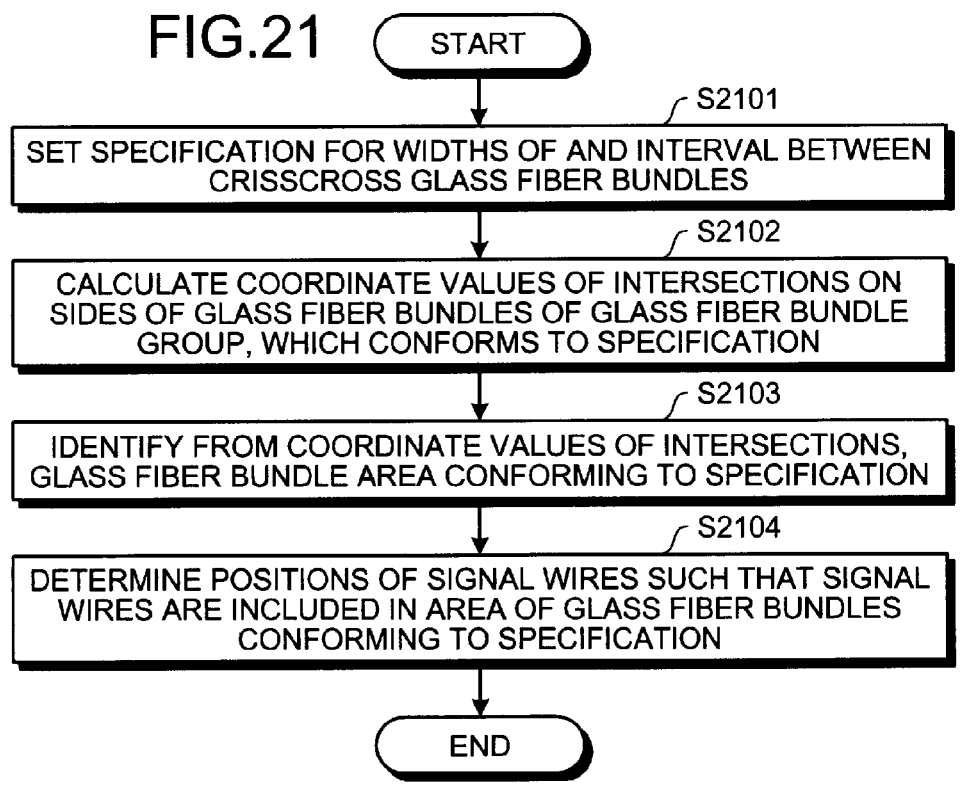
FIG. 21 is a flowchart of details of a process procedure of a design process executed by a designing apparatus 201.

FIG. 21 is a flowchart of the details of a process procedure of a design process executed by the designing apparatus 201. As depicted in FIG. 21, the designing apparatus 201 sets the specification for the widths of and the interval between the crisscross glass fiber bundles (step S2101).

The designing apparatus 201 calculates the coordinate values of the intersections CP on the sides of the glass fiber bundles of the glass fiber bundle group, which conforms to the specification (step S2102). The designing apparatus 201 identifies from the coordinate values of the intersections CP, a glass fiber bundle area conforming to the specification (step S2103).

The designing apparatus 201 determines the positions of the signal wires such that the signal wires are included in the area G of the glass fiber bundles conforming to the specification (step S2104). The designing apparatus 201 causes the design process to come to an end. Thereby, when the glass fiber bundle group in the insulation layer is present at the position conforming to the specification, the designing apparatus 201 can produce the position information for the signal wires to be included in the area G of the glass fiber bundles.

Details of a process procedure of a check process executed by the checking apparatus 202 will be described with reference to FIG. 22. The check process is a process of producing the position information for the area of the glass fiber bundles in the insulation layer to be actually used.

FIG. 22 is a flowchart of the details of process procedure of the check process executed by the checking apparatus 202. The checking apparatus 202 first transmits an X-ray beam through the insulation layer and calculates the coordinate values of the intersections CP on the edges of the glass fiber bundles of the actual glass fiber bundle group from the amount of X-ray beam transmitted therethrough (step S2201).

The checking apparatus 202 connects the calculated coordinate values, using straight lines, to identify the area G of the glass fiber bundles (step S2202). The checking apparatus 202 determines whether the width of each of and the interval between the crisscross glass fiber bundles conform to the specification (step S2203). If the checking apparatus 202 determines that the width and the interval conform to the specification (step S2203: YES), the checking apparatus 202 causes the check process to come to an end.

On the other hand, if the checking apparatus 202 determines that the width and the interval do not conform to the specification (step S2203: NO), the checking apparatus 202 replaces the insulation layer to be checked with another insulation layer (step S2204) and the procedure returns to step S2201. Thereby, the manufacturing apparatus 204 can manufacture the substrate using the insulation layer that is determined by the checking apparatus 202 to conform to the specification.

Details of a process procedure of a design support process executed by the design support apparatus 203 will be described with reference to FIG. 23. The design support process is the process depicted in FIGS. 8 to 16 and is a process of converting the position information for the signal wires into the position information for the position in the area of the glass fiber bundles in the actual insulation layer.

FIG. 23 is a flowchart of the details of a process procedure of the design support process executed by the design support apparatus 203. As depicted in FIG. 23, the design support apparatus 203 first determines whether a signal wire is present that runs off the area G of the glass fiber bundles (step S2301). If the design support apparatus 203 determines that no such signal wire is present (step S2301: NO), the design support apparatus 203 causes the design support apparatus to come to an end.

On the other hand, if the design support apparatus 203 determines that such signal wires are present (step S2301: YES), the design support apparatus 203 determines whether the signal wires running off the area G of the glass fiber bundles are differential wires (step S2302). If the design support apparatus 203 determines that the signal wires are not differential wires (step S2302: NO), the design support apparatus 203 converts the position information for the signal wires into the position information for the position in the area G of the glass fiber bundles (step S2303) and causes the design support process to come to an end.

On the other hand, if the design support apparatus 203 determines that the signal wires are differential wires (step S2302: YES), the design support apparatus 203 determines whether the interval between the differential wires needs to be changed (step S2304). If the design support apparatus 203 determines that the interval does not need to be changed (step S2304: NO), the design support apparatus 203 converts the position information for the signal wires into the position information for the position in the area G of the glass fiber bundles such that the signal wires are included in the area G of the glass fiber bundles (step S2305) and causes the design support process to come to an end.

On the other hand, if the design support apparatus 203 determines that the interval needs to be changed (step S2304: YES), the design support apparatus 203 changes the interval between the differentially wired signal wires to the interval between the glass fiber bundles (step S2306). The design support apparatus 203 changes the line widths of the signal wires to line widths with which the impedance can be maintained to be constant before and after the change of the interval between the signal wires (step S2307). The design support apparatus 203 converts the position information for the signal wire into the position information for the position in the area G of the glass fiber bundles such that the signal wires are included in the area G of the glass fiber bundles (step S2308) and causes the design support process to come to end. Thereby, the manufacturing apparatus 204 can manufacture the substrate having signal wires whose impedance variation is suppressed, by disposing the signal wires at the respective positions determined by the design support apparatus 203.

Details of a process procedure of a manufacture process executed by the manufacture apparatus 204 will be described with reference to FIG. 24. The manufacture process is a process of manufacturing the substrate according to the position information that is converted by the design support apparatus 203.

FIG. 24 is a flowchart of the details of the process procedure of the manufacturing process executed by the manufacturing apparatus 204. As depicted in FIG. 24, the manufacturing apparatus 204 forms the signal wires at the respective positions determined by the design support apparatus 203 (step S2401). The manufacturing apparatus 204 stacks inner layers sandwiching the signal wires therebetween and bonds the inner layers to each other (step S2402). The manufacturing apparatus 204 stacks the signal wires and a surface layer and bonds the signal wires and the surface layer to each other (step S2403) and causes the manufacturing process to come to an end. Thereby, the manufacturing apparatus 204 can manufacture the substrate.

As described, in the wiring layer stacked on a given insulation layer, the design support apparatus 203 converts the position information for the signal wires of single-end wiring that extend out of the area G of the glass fiber bundles into the position information for a position in the area G of the glass fiber bundles, maintaining the line widths of the signal wires. Thereby, the design support apparatus 203 can determine the position of the signal wires with which the impedance variation of the signal wires can be suppressed.

When the signal wires extending off the area G of the glass fiber bundles are differentially wired signal wires, in the wiring layer stacked on a given insulation layer, the design support apparatus 203 converts the position information for the signal wires into the position information for the position in the area G of the glass fiber bundles, maintaining the interval between the differentially wired signal wires and the line widths of the signal wires. Thereby, the design support apparatus 203 can determine the position of the signal wires with which the variation of the differential impedance of the differentially wired signal wires can be suppressed.

When the signal wires extending off the area G of the glass fiber bundles are differential wires in the wiring layer stacked on a given insulation layer, the design support apparatus 203 may be unable to convert the position information for the signal wires into the position information for the position in the area G of the glass fiber bundles, maintaining the interval between the differentially wired signal wires. In this case, the design support apparatus 203 changes the interval between the differentially wired signal wires to a interval with which the position information for the signal wires can be converted into the position information for the position in the area G of the glass fiber bundles. The design support apparatus 203 changes the line widths of the signal wires such that the differential impedance of the differentially wired signal wires is constant before and after the change of the interval. Thereby, the design support apparatus 203 can determine the position of the signal wires with which variation of the differential impedance of the differentially wired signal wires can be suppressed.

The design support apparatus 203 converts the position information for the single-end wired signal wires extending off the overlapping area of the glass fiber bundles in the wiring layer sandwiched by two insulation layers into the position information for the position in the area G of the glass fiber bundles, maintaining the line widths of the signal wires. Thereby, the design support apparatus 203 can determine the position of the signal wires with which the impedance variation of the signal wires can be suppressed.

When the signal wires extending off the overlapping area of the glass fiber bundles are differentially wired signal wires, in the wiring layer sandwiched between two insulation layers, the design support apparatus 203 converts the position information for the signal wires into the position information for the position in the area G of the glass fiber bundles, maintaining the interval between the differentially wired signal wires and the line widths of the signal wires. Thereby, the design support apparatus 203 can determine the position of the signal wires with which the variation of the differential impedance of the differentially wired signal wires can be suppressed.

When the signal wires extending off the overlapping area of the glass fiber bundles are differential wires in the wiring layer sandwiched between two insulation layers, the design support apparatus 203 may be unable to convert the position information for the signal wires into the position information for the position in the area G of the glass fiber bundles, maintaining the interval between the differentially wired signal wires. In this case, the design support apparatus 203 changes the interval between the differentially wired signal wires to an interval with which the position information for the signal wires can be converted into the position information for the position in the area G of the glass fiber bundles. The design support apparatus 203 changes the line widths of the signal wires such that the differential impedance of the differentially wired signal wires is constant before and after the change of the interval. Thereby, the design support apparatus 203 can determine the position of the signal wires with which variation of the differential impedance of the differentially wired signal wires can be suppressed.

The manufacturing apparatus 204 disposes the signal wires in the wiring layer according to the position information converted by the design support apparatus 203. Thereby, the manufacturing apparatus 204 can manufacture the substrate having therein the signal wires whose impedance variation is suppressed.

The manufacture method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a design support program that causes a computer to execute a process comprising:
    acquiring position information for a signal wire in a wiring layer and position information for a fiber bundle group by projecting, in a direction for fiber bundles of the fiber bundle group to be stacked, the fiber bundle group in an insulation layer stacked on the wiring layer;
    first detecting based on the position information for the signal wire and the position information for the fiber bundle group, a non-overlapping point where the signal wire and the fiber bundle group do not overlap in the direction for the fiber bundle group to be stacked;
    identifying based on the position information for the signal wire, position information for a non-overlappinq signal wire portion of the signal wire, the non-overlapping signal wire portion including the detected non-overlapping point; and
    first converting the identified position information for the non-overlappinq signal wire portion into position information for a position in an area of the fiber bundles such that the non-overlapping signal wire portion is included in an area identified by the position information for fiber bundles that are parallel to a direction for the non-overlapping signal wire portion to be disposed, among the fiber bundle group.

2. The non-transitory computer-readable recording medium according to claim 1, wherein
    the acquiring includes acquiring, when the signal wire is a first signal wire among differential signal wires, position information for a second signal wire among the differential signal wires,
    the identifying includes identifying based on the position information for the second signal wire, position information for a signal wire portion that is of the second signal wire and parallel to the non-overlapping signal wire portion of the first signal wire,
    the first converting includes converting the position information for the signal wire portion of the second signal wire into candidate position information for the signal wire portion of the second signal wire by using a variation amount used for the non-overlapping signal wire portion of the first signal wire to maintain an interval between the non-overlapping signal wire portion of the first signal wire and the signal wire portion of the second signal wire, and further comprising:
    second detecting, based on the candidate position information for the signal wire portion of the second signal wire and the position information for the fiber bundle group, a non-overlapping point where a candidate signal wire portion of the second signal wire and the fiber bundle group do not overlap in the direction for the second signal wire and the fiber bundle group to be stacked, and
    second converting, when the non-overlapping point is not detected for the signal wire portion of the second signal wire, determining the candidate position information for the signal wire portion of the second signal wire as the position information for the signal wire portion of the second signal wire.

3. The non-transitory computer-readable recording medium according to claim 2, wherein
    the second converting includes, when a non-overlapping point is detected for the signal wire portion of the second signal wire, maintaining differential impedance concerning the non-overlapping signal wire portion of the first signal wire and the signal wire portion of the second signal wire, and converting the position information for the non-overlapping signal wire portion of the first signal wire and that of the second signal wire into position information for a position in an area of the fiber bundles such that a line width of the non-overlapping signal wire portion of the first signal wire, that of the second signal wire, and an interval therebetween are increased.

4. A non-transitory computer-readable recording medium storing a design support program that causes a computer to execute a process comprising:
    acquiring position information for a signal wire in a wiring layer, position information for a first fiber bundle group by projecting, in a direction for first fiber bundle of the first fiber bundle group to be stacked, the first fiber bundle group in a first insulation layer stacked on the wiring layer and position information for a second fiber bundle group acquired by projecting, in the direction for the second fiber bundle group to be stacked, the second fiber bundle group in a second insulation layer stacked on the wiring layer;
    first detecting based on the position information for the signal wire, the position information for the first fiber bundle group, and the position information for the second fiber bundle group, a non-overlapping point where the signal wire and any one of the first and the second fiber bundle group do not overlap in the direction for stacking;
    identifying based on the position information for the signal wire, position information for a non-overlapping signal wire portion of the signal wire, the non-overlapping signal wire portion including the detected non-overlapping point; and first converting the position information for the identified non-overlapping signal wire portion into position information for a position in an area of the first and the second fiber bundles such that the non-overlapping signal wire portions are included in an area identified by the position information for the first fiber bundle parallel to a direction for the non-overlapping signal wire portion to be disposed and an area identified by the position information for the second fiber bundle parallel to a direction for the signal wire portion to be disposed.

5. The non-transitory computer-readable recording medium according to claim 4, wherein the acquiring includes acquiring, when the signal wire is a first signal wire among differential signal wires, position information for a second signal wire among the differential signal wires, the identifying includes identifying based on the position information for the second signal wire, position information for a signal wire portion that is of the second signal wire and parallel to the non-overlapping signal wire portion of the first signal wire, the first converting includes converting the position information for the signal wire portion of the second signal wire into candidate position information for the signal wire portion of the second signal wire by using a variation amount used for the non-overlapping signal wire portion of the first signal wire to maintain an interval between the non-overlappinq signal wire portion of the first signal wire and the signal wire portion of the second signal wire, and further comprising:

second detecting, based on the candidate position information for the signal wire portion of the second signal wire and the position information for the first and the second fiber bundle group, a non-overlapping point where a candidate signal wire portion of the second signal wire and the first or the second fiber bundle group do not overlap in the direction for the second signal wire and the first or the second fiber bundle group to be stacked, and second converting, when the non-overlapping point is not detected for the signal wire portion of the second signal wire, determining the candidate position information for the signal wire portion of the second signal wire as the position information for the signal wire portion of the second signal wire.

6. The non-transitory computer-readable recording medium according to claim 5, wherein the second converting includes, when a non-overlapping point is detected for the signal wire portion of the second signal wire, maintaining differential impedance concerning the non-overlapping signal wire portion of the first signal wire and the signal wire portion of the second signal wire, and converting the position information for the non-overlapping signal wire portion of the first signal wire and that of the second signal wire into position information for a position in an area of the fiber bundles such that a line width of the non-overlapping signal wire portion of the first signal wire, that of the second signal wire, and an interval therebetween are increased.

7. A design support method executed by a computer, the computer comprising a processor, the design support method comprising:

acquiring, by the processor, position information for a signal wire in a wiring layer and position information for a fiber bundle group by projecting, in a direction for fiber bundles of the fiber bundle group to be stacked, the fiber bundle group in an insulation layer stacked on the wiring layer;

first detecting, by the processor, based on the position information for the signal wire and the position information for the fiber bundle group, a non-overlapping point where the signal wire and the fiber bundle group do not overlap in the direction for the fiber bundle group to be stacked;

identifying, by the processor, based on the position information for the signal wire, position information for a non-overlapping signal wire portion of the signal wire, the non-overlapping signal wire portion including the detected non-overlapping point; and first converting, by the processor, the identified position information for the non-overlapping signal wire portion into position information for a position in an area of the fiber bundles such that the non-overlapping signal wire portion is included in an area identified by the position information for fiber bundles that are parallel to a direction for the non-overlappinq signal wire portion to be disposed, among the fiber bundle group.

* * * * *